United States Patent
Gulin

(10) Patent No.: US 11,995,519 B2
(45) Date of Patent: May 28, 2024

(54) METHOD OF AND SERVER FOR CONVERTING CATEGORICAL FEATURE VALUE INTO A NUMERIC REPRESENTATION THEREOF AND FOR GENERATING A SPLIT VALUE FOR THE CATEGORICAL FEATURE

(71) Applicant: YANDEX EUROPE AG, Lucerne (CH)

(72) Inventor: Andrey Vladimirovich Gulin, Moscow region (RU)

(73) Assignee: Direct Cursus Technology L.L.C, Dubai (AE)

( * ) Notice: Subject to any disclaimer, the term of this patent is extended or adjusted under 35 U.S.C. 154(b) by 1089 days.

(21) Appl. No.: 16/000,977

(22) Filed: Jun. 6, 2018

(65) Prior Publication Data

US 2019/0164085 A1    May 30, 2019

(30) Foreign Application Priority Data

Nov. 24, 2017   (RU) .......................... RU2017140973

(51) Int. Cl.
 *G06N 20/00* (2019.01)
 *G06F 16/901* (2019.01)
 *G06N 5/045* (2023.01)

(52) U.S. Cl.
 CPC ......... *G06N 20/00* (2019.01); *G06F 16/9027* (2019.01); *G06N 5/045* (2013.01)

(58) Field of Classification Search
 CPC ............................. G06N 20/00; G06N 5/045
 See application file for complete search history.

(56) References Cited

U.S. PATENT DOCUMENTS

| | | | |
|---|---|---|---|
| 5,652,829 A | | 7/1997 | Hong |
| 5,657,424 A | * | 8/1997 | Farrell ................. G10L 15/05 704/238 |
| 5,978,497 A | | 11/1999 | Lee et al. |
| 6,115,802 A | | 9/2000 | Tock et al. |

(Continued)

FOREIGN PATENT DOCUMENTS

| | | |
|---|---|---|
| CN | 100562856 C | 11/2009 |
| JP | 2008511082 A | 4/2008 |

(Continued)

OTHER PUBLICATIONS

Nettleton et al., "Analysis of Web Search Engine Clicked Documents", 2006, 2006 Fourth Latin American Web Congress, pp. 209-219. (Year: 2006).*

(Continued)

*Primary Examiner* — Alexey Shmatov
*Assistant Examiner* — Clint Mullinax
(74) *Attorney, Agent, or Firm* — BCF LLP

(57) ABSTRACT

There is disclosed a method of and a system for training and using a Machine Learning Algorithm (MLA), the MLA using a decision tree model having a decision tree. During training a training object being associated with a categorical feature and is processed at a node of the decision tree. The method comprises calculating a numeric representation of the categorical feature and the value of the splits for the node "in-line" with generating a given iteration of the decision tree.

9 Claims, 14 Drawing Sheets

(56) References Cited

U.S. PATENT DOCUMENTS

| | | | |
|---|---|---|---|
| 6,247,016 B1* | 6/2001 | Rastogi | G06F 16/285 |
| | | | 707/999.102 |
| 6,279,004 B1 | 8/2001 | Lee et al. | |
| 6,360,220 B1 | 3/2002 | Forin | |
| 6,523,015 B1 | 2/2003 | Bera et al. | |
| 6,988,180 B2 | 1/2006 | Kadatch | |
| 7,113,932 B2 | 9/2006 | Tayebnejad et al. | |
| 7,287,012 B2 | 10/2007 | Corston et al. | |
| 7,349,917 B2 | 3/2008 | Forman et al. | |
| 7,349,926 B2 | 3/2008 | Mckenney et al. | |
| 7,451,166 B2 | 11/2008 | Damani et al. | |
| 7,574,409 B2 | 8/2009 | Patinkin | |
| 7,668,851 B2 | 2/2010 | Triplett | |
| 7,673,233 B2 | 3/2010 | Moore et al. | |
| 7,702,628 B1 | 4/2010 | Luchango et al. | |
| 7,743,003 B1 | 6/2010 | Tong et al. | |
| 7,916,728 B1 | 3/2011 | Mimms | |
| 7,930,353 B2 | 4/2011 | Chickering et al. | |
| 8,010,466 B2 | 8/2011 | Patinkin | |
| 8,032,550 B2 | 10/2011 | Schneider | |
| 8,032,551 B2 | 10/2011 | Schneider | |
| 8,136,025 B1 | 3/2012 | Zhu et al. | |
| 8,150,723 B2 | 4/2012 | Chen et al. | |
| 8,190,537 B1 | 5/2012 | Singh et al. | |
| 8,214,157 B2 | 7/2012 | Moser et al. | |
| 8,250,009 B1 | 8/2012 | Breckenridge et al. | |
| 8,301,847 B2 | 10/2012 | Dantzig et al. | |
| 8,311,967 B1 | 11/2012 | Lin et al. | |
| 8,341,158 B2 | 12/2012 | Acharya | |
| 8,370,337 B2 | 2/2013 | Kanungo et al. | |
| 8,396,287 B2 | 3/2013 | Adam et al. | |
| 8,412,648 B2 | 4/2013 | Karypis et al. | |
| 8,438,122 B1 | 5/2013 | Mann et al. | |
| 8,473,431 B1 | 6/2013 | Mann et al. | |
| 8,489,632 B1 | 7/2013 | Breckenridge et al. | |
| 8,533,224 B2 | 9/2013 | Lin et al. | |
| 8,543,517 B2 | 9/2013 | Shotton et al. | |
| 8,543,586 B2 | 9/2013 | Glachant et al. | |
| 8,572,071 B2 | 10/2013 | Pottenger et al. | |
| 8,583,567 B1 | 11/2013 | Kumar et al. | |
| 8,584,233 B1 | 11/2013 | Yang et al. | |
| 8,595,154 B2 | 11/2013 | Breckenridge et al. | |
| 8,611,592 B2 | 12/2013 | Wallace et al. | |
| 8,655,029 B2 | 2/2014 | Shiell et al. | |
| 8,661,029 B1 | 2/2014 | Kim et al. | |
| 8,694,444 B2 | 4/2014 | Faddoul et al. | |
| 8,762,299 B1 | 6/2014 | Breckenridge et al. | |
| 8,843,427 B1 | 9/2014 | Lin et al. | |
| 8,868,472 B1 | 10/2014 | Lin et al. | |
| 8,880,446 B2 | 11/2014 | Wellman et al. | |
| 8,909,564 B1 | 12/2014 | Kaplow et al. | |
| 8,965,829 B2 | 2/2015 | Pattillo | |
| 9,002,682 B2 | 4/2015 | Kasabov | |
| 9,038,172 B2 | 5/2015 | Miller et al. | |
| 9,348,920 B1 | 5/2016 | Kesin | |
| 9,639,807 B2 | 5/2017 | Berengueres et al. | |
| 2002/0143787 A1 | 10/2002 | Knee et al. | |
| 2002/0188424 A1 | 12/2002 | Grinstein et al. | |
| 2002/0188618 A1 | 12/2002 | Ma et al. | |
| 2003/0014405 A1 | 1/2003 | Shapiro et al. | |
| 2003/0061213 A1 | 3/2003 | Yu et al. | |
| 2003/0074341 A1 | 4/2003 | Blackburn et al. | |
| 2003/0163462 A1 | 8/2003 | Kawamura | |
| 2003/0176931 A1 | 9/2003 | Pednault et al. | |
| 2003/0204483 A1 | 10/2003 | Arning et al. | |
| 2004/0111169 A1* | 6/2004 | Hong | G06K 9/6217 |
| | | | 700/44 |
| 2004/0215430 A1 | 10/2004 | Huddleston et al. | |
| 2004/0215606 A1 | 10/2004 | Cossock | |
| 2005/0189415 A1* | 9/2005 | Fano | G06Q 30/02 |
| | | | 705/14.69 |
| 2006/0026138 A1 | 2/2006 | Robertson et al. | |
| 2006/0112121 A1 | 5/2006 | Mckenney et al. | |
| 2006/0136390 A1 | 6/2006 | Zhao et al. | |
| 2007/0005646 A1 | 1/2007 | Dumais et al. | |
| 2007/0217676 A1 | 9/2007 | Grauman et al. | |
| 2007/0244747 A1 | 10/2007 | Nikovski | |
| 2008/0071542 A1 | 3/2008 | Yu | |
| 2008/0077544 A1 | 3/2008 | Sureka | |
| 2008/0154938 A1 | 6/2008 | Cheslow | |
| 2008/0307069 A1 | 12/2008 | Froment et al. | |
| 2009/0030864 A1 | 1/2009 | Pednault et al. | |
| 2009/0031924 A1 | 2/2009 | White et al. | |
| 2009/0164437 A1 | 6/2009 | Torbjornsen | |
| 2009/0182723 A1 | 7/2009 | Shnitko et al. | |
| 2009/0319481 A1 | 12/2009 | Chitrapura et al. | |
| 2010/0030780 A1 | 2/2010 | Eshghi et al. | |
| 2010/0042603 A1 | 2/2010 | Smyros et al. | |
| 2010/0082421 A1 | 4/2010 | Tuladhar et al. | |
| 2010/0312727 A1 | 12/2010 | Pottenger et al. | |
| 2011/0055000 A1 | 3/2011 | Zhang et al. | |
| 2011/0153611 A1 | 6/2011 | Ankisettipalli et al. | |
| 2011/0188715 A1 | 8/2011 | Shotton et al. | |
| 2011/0225372 A1 | 9/2011 | Pirog | |
| 2011/0225589 A1 | 9/2011 | Pirog et al. | |
| 2012/0203745 A1 | 8/2012 | Myers et al. | |
| 2012/0278263 A1 | 11/2012 | Borthwick et al. | |
| 2013/0117684 A1 | 5/2013 | Ingole et al. | |
| 2013/0173571 A1 | 7/2013 | Chen et al. | |
| 2013/0345585 A1 | 12/2013 | Gopal et al. | |
| 2014/0012238 A1 | 1/2014 | Chen et al. | |
| 2014/0027975 A1 | 1/2014 | Mizuno | |
| 2014/0122381 A1 | 5/2014 | Nowozin | |
| 2014/0129493 A1 | 5/2014 | Leopold | |
| 2014/0195972 A1 | 7/2014 | Lee et al. | |
| 2014/0203999 A1 | 7/2014 | Shim | |
| 2014/0214736 A1* | 7/2014 | Kimmel | G06N 5/01 |
| | | | 706/12 |
| 2014/0317115 A1 | 10/2014 | Pauly | |
| 2014/0337255 A1 | 11/2014 | Eads | |
| 2014/0337269 A1 | 11/2014 | Eads | |
| 2015/0012465 A1 | 1/2015 | Pingenot | |
| 2015/0199699 A1* | 7/2015 | Milton | H04W 4/029 |
| | | | 705/7.34 |
| 2015/0356458 A1 | 12/2015 | Berengueres et al. | |
| 2015/0379423 A1 | 12/2015 | Dirac et al. | |
| 2015/0379426 A1 | 12/2015 | Steele et al. | |
| 2016/0155070 A1 | 6/2016 | Hoover et al. | |
| 2017/0091670 A1 | 3/2017 | Gulin et al. | |
| 2018/0232375 A1* | 8/2018 | Venkataraman | G06N 5/01 |

FOREIGN PATENT DOCUMENTS

| | | |
|---|---|---|
| JP | 2011129135 A | 6/2011 |
| RU | 2391791 C2 | 6/2010 |
| RU | 2435212 C2 | 11/2011 |
| RU | 2491622 C1 | 8/2013 |
| RU | 2015141339 A | 4/2017 |
| RU | 2015141340 A | 4/2017 |
| RU | 2632133 C2 | 10/2017 |
| WO | 2006072011 A2 | 7/2006 |
| WO | 2006102381 A2 | 9/2006 |
| WO | 2013001535 A2 | 1/2013 |

OTHER PUBLICATIONS

Office Action with regard to the counterpart U.S. Appl. No. 16/000,809 mailed Jun. 8, 2021.

Ahmad, et al. "Random Ordinality Ensembles: Ensemble methods for multi-valued categorical data", Information Science 296 (2015) 75-94 (Year: 2015)—cited in the Office Action with regard to the counterpart U.S. Appl. No. 16/000,819 mailed May 27, 2021.

Office Action with regard to the counterpart U.S. Appl. No. 16/000,819 mailed May 27, 2021.

An Office Action issued on Apr. 25, 2019 in respect of the U.S. Appl. No. 15/263,654.

Search Report with regard to the counterpart RU Patent Application No. 2017140973 completed Mar. 21, 2019.

Search Report with regard to the counterpart RU Patent Application No. 2017140974 completed Apr. 11, 2019.

Search Report with regard to the counterpart RU Patent Application No. 2017140969 completed Jan. 30, 2019.

(56) References Cited

OTHER PUBLICATIONS

English Translation of Claims for RU2015141339 retrieved on Internet on Jun. 7, 2019.
English Abstract for RU2015141340 retrieved on Espacenet on Jun. 7, 2019.
Prokhorenkova et al., "CatBoost: unbiased boosting with categorical features", Yandex, Moscow, Apr. 2018, pp. 1-11.
Gulin, "Online Learning or Don't Look Ahead", Yandex, Oct. 2015, https://www.youtube.com/watch?v=rAwFI3UPqCQ&t.
Dorogush et al., "CatBoost: gradient boosting with categorical features support", Yandex, Moscow, pp. 1-7.
Wolpert, "Stacked Generalization", Complex Systems Group, Theoretical Division, and Center for Non-linear Studies, Los Alamos, 57 pages.
Breiman, "Stacked Regressions", Machine Learning, 24, 49-64, 1996, pp. 50-64.
Bai et al., "Learning to Rank with (a Lot of) Word Features", NEC Labs America, Princeton, USA, pp. 1-24.
Chen et al., "XGBoost: A Scalable Tree Boosting System", KDD, August, USA, 2016, 13 pages.
Cortes et al., "Deep Boosting", Proceedings of the 31st International Conference on Machine Learning, China, 2014, vol. 32, 9 pages.
Suen et al., "Combining Bias and Variance Reduction Techniques for Regression Trees", Proceedings of The 16th European Conference on Machine Learning (ECML), Portugal, 2005, 8 pages.
Suen et al., "Combining Bias and Variance Reduction Techniques for Regression", Technical Report UT-AI-TR-05-321, Austin, 12 pages.
Ling et al., "Model Ensemble for Click Prediction in Bing Search Ads", International World Wide Web Conference Committee (IW3C2), Australia, 2017, pp. 689-698.
Wu et al., "A Two-Stage Ensemble of Diverse Models for Advertisement Ranking in KDD Cup 2012", 14 pages.
Hillard et al., "The Sum of Its Parts: Reducing Sparsity in Click Estimation with Query Segments", Yahoo! Inc, USA, 30 pages.
Chapelle et al., "Simple and Scalable Response Prediction for Display Advertising", ACM Transactions on Intelligent Systems and Technology, vol. 5, No. 4, Article 61, 2014, pp. 1-34.
Chapelle, "Modeling Delayed Feedback in Display Advertising", KDD'14, USA, 2014, 9 pages.
Graepel, "Web-Scale Bayesian Click-Through Rate Prediction for Sponsored Search Advertising in Microsoft's Bing Search Engine", Proceedings of the 27th International Conference on Machine Learning, Israel, 2010, 8 pages.
Jimenez et al., "Neural Methods for Dynamic Branch Prediction", ACM Transactions on Computer Systems, 2002, vol. 20, No. 4, pp. 369-397.
Croux et al., "Trimmed Bagging", Faculty of Economics and Management University Center of Statistics, Belgium, pp. 1-9.
Breiman, "Using Adaptive Bagging to Debias Regressions", Technical Report 547, USA, 1999, pp. 1-16.
Sorokina et al., "Additive Groves of Regression Trees", Department of Computer Science, Cornell University, Ithaca, NY, USA, pp. 1-12.
Ganjisaffar et al., "Bagging Gradient-Boosted Trees for High Precision, Low Variance Ranking Models", China, 2011, 10 pages.
Koltchinskii et al., "Empirical Margin Distributions and Bounding the Generalization Error of Combined Classifiers", The Annals of Statistics, 2002, vol. 30, No. 1, pp. 1-50.
Koltchinskii et al., "Some New Bounds on the Generalization Error of Combined Classifiers", Department of Mathematics and Statistics, USA, 7 pages.
Blum et al., "The Ladder: A Reliable Leaderboard for Machine Learning Competitions", 2015, pp. 1-16.
"Boosting", Machine Learning for Trading, 2016, https://www.youtube.com/watch?v=GM3CDQfQ4sw.
"XGBoost A Scalable Tree Boosting System", LA Machine Learning Meetup Group, 2016, https://www.youtube.com/watch?v=Vly8xGnNiWs.

"Machine learning—Decision trees", UBC by Nando de Freitas, 2013, https://www.youtube.com/watch?v=-dCtJjIEEgM&feature=youtu.be&t=35m.
"XGBoost A Scalable Tree Boosting System", LA Machine Learning Meetup Group, 2016, https://www.youtube.com/watch?v=Vly8xGnNiWs&feature=youtu.be&t=27m.
"XGBoost A Scalable Tree Boosting System", LA Machine Learning Meetup Group, 2016, https://www.youtube.com/watch?v=Vly8xGnNiWs&feature=youtu.be&t=30m.
Kerdprasop, "Discrete Decision Tree Induction to Avoid Overfitting on Categorical Data", Recent Researches in Computational Techniques, Non-Linear Systems and Control, ISBN: 978-1-61804-011-4, pp. 247-252.
Seldin et al., "Multi-Classification by Categorical Features via Clustering", Proceedings of the 25 th International Conference on Machine Learning, Finland, 2008, 8 pages.
Zhang, "Deep Learning over Multi-field Categorical Data", University College London, United Kingdom, 2016, 12 pages.
Friedman, "1999 Reitz Lecture—Greedy Function Approximation: A Gradient Boosting Machine", The Annals of Statistics, 2001, vol. 29, No. 5, pp. 1189-1232.
Micci-Barreca, "A Preprocessing Scheme for High-Cardinality Categorical Attributes in Classification and Prediction Problems", SIGKDD Explorations, USA, vol. 3, Issue 1, pp. 27-32.
Chen et al., "Large-Scale Behavioral Targeting", KDD'09, France, 2009, pp. 209-217.
Mcmahan et al., "Ad Click Prediction: a View from the Trenches", KDD'13, USA, 2013, 9 pages.
Yeh et al., "Two-level adaptive training branch prediction", originally published in Proc. 24ty Ann. Int'l Symp. Microarchitecture, 1991, 14 pages.
Hothorn et al., "Double-bagging: combining classifers by bootstrap aggregation", Pattern Recognition, 2003, vol. 36, pp. 1303-1309.
Breiman, "Using Iterated Bagging to Debias Regressions", Machine Learning, vol. 45, 2001, pp. 261-277.
English Abstract for US2006047925 (A1) (corresponding document for JP2008511082) retrieved on Espacenet on Apr. 30, 2018.
English Abstract for JP2011129135 retrieved on Espacenet on Apr. 30, 2018.
English Abstract for US2006047925 (A1) (corresponding document for CN100562856) retrieved on Espacenet on Jun. 6, 2018.
Russian search report dated Oct. 13, 2016 from Russian Patent Application No. 2015141339.
U.S. Appl. No. 15/263,665, filed Sep. 13, 2016.
U.S. Appl. No. 15/263,633, filed Sep. 13, 2016.
U.S. Appl. No. 15/263,654, filed Sep. 13, 2016.
International Search Report and Written Opinion with regard to PCT/IB2015/059001 mailed Feb. 18, 2016.
International Preliminary Report on Patentability with regard to PCT/IB2015/059001 mailed Aug. 25, 2016.
International Search Report and Written Opinion with regard to PCT/IB2015/058957 mailed Feb. 10, 2016.
International Preliminary Report on Patentability with regard to PCT/IB2015/058957 mailed Nov. 4, 2016.
Dwork, "Calibrating Noise to Sensitivity in Private Data Analysis", Microsoft Research, Silicon Valley, pp. 1-20.
"Categorical variables: Solving the overfitting problem in decision trees", Mixotricha, 2010, 5 pages (Screenshot).
"Display Advertising Challenge", Kaggle, 2017, 2 pages (Screenshot), https://www.kaggle.com/c/criteo-display-ad-challenge.
"Feature hashing", Wikipedia, 2017, 4 pages, https://en.wikipedia.org/wiki/Feature_hashing.
Koltchinskii et al., "Further Explanation of the Effectiveness of Voting Methods: The Game between Margins and Weights", D. Helmbold and B. Williamson (Eds.), 2001, 2 pages.
Zhao et al., "GB-CENT: Gradient Boosted Categorical Embedding and Numerical Trees", International World Wide Web Conference Committee, 2017, Australia, 9 pages.
"Gradient Boosting", Wikipedia, 2017, 6 pages (Screenshot), https://en.wikipedia.org/wiki/Gradient_boosting.
"Greedy Algorithm", Wikipedia, 2017, 4 pages (Screenshot), https://en.wikipedia.org/wiki/Greedy_algorithm.

(56) References Cited

OTHER PUBLICATIONS

"Grupo Bimbo Inventory Demand", Kaggle, 2017, 2 pages (Screenshot), https://www.kaggle.com/c/grupo-bimbo-inventory-demand.
"Including High-Cardinality Attributes in Predictive Models a Case Study in Churn Prediction in the Energy Sector", 2017, Abstract, 4 pages (Screenshot), https://www.researchgate.net/publication/272522918_Including_High-Cardinality_Attributes_in_Predictive_Models_a_Case_Study_in_Churn_Prediction_in_the_Energy_Sector.
"Liberty Mutual Group: Property Inspection Prediction", Kaggle, 2017, 2 pages (Screenshot), https://www.kaggle.com/c/liberty-mutual-group-property-inspection-prediction.
Zumel, "Modeling Trick: Impact Coding of Categorical Variables with Many Levels", Win-Vector Blog, 2012, 10 pages http://www.win-vector.com/blog/2012/07/modeling-trick-impact-coding-of-categorical-variables-with-many-levels/.
Panchenko, "New Zero-Error Bounds for Voting Algorithms", 2001, USA, pp. 1-16.
Breiman, "Out-of-Bag Estimation", USA, pp. 1-13.
Valle et al., "Two bagging algorithms with coupled learners to encourage diversity", Chile, 10 pages.
"Bootstrapping vs Bayesian Bootstrapping conceptually?", StackExchange, 2017, 2 pages (Screenshot), https://stats.stackexchange.com/questions/181350/bootstrapping-vs-bayesian-bootstrapping-conceptually.
"Springleaf Marketing Response", Kaggle, 2017, 2 pages (Screenshot), https://www.kaggle.com/c/springleaf-marketing-response.
"RecSys Challenge 2015", 2017, 1 page (Screenshot), https://recsys.acm.org/recsys15/challenge/.
"A fast, distributed, high performance gradient boosting (GBDT, GBRT, GBM or MART) framework based on decision tree algorithms, used for ranking, classification and many other machine learning tasks. It is under the umbrella of the DMTK", GitHub, 2017, 3 pages (Screenshot), https://github.com/Microsoft/LightGBM.
"Scalable, Portable and Distributed Gradient Boosting (GBDT, GBRT or GBM) Library, for Python, R, Java, Scala, C++ and more. Runs on single machine, Hadoop, Spark, Flink and DataFlow", GitHub, 2017, 2 pages (Screenshot), https://github.com/dmlc/xgboost.
Zhang, "What is outoffold average?", 2017, 2 pages (Screenshot), https://stats.stackexchange.com/questions/224237/what-is-out-of-fold-average/224240.
"Boosting (machine learning)", Wikipedia, 2017, 5 pages (Screenshot), https://en.wikipedia.org/wiki/Boosting_(machine_learning).
"Bosch Production Line Performance", Kaggle, 2017, 2 pages (Screenshot), https://www.kaggle.com/c/bosch-production-line-performance.
"BNP Paribas Cardif Claims Management", Kaggle, 2017, 2 pages (Screenshot), https://www.kaggle.com/c/bnp-paribas-cardif-claims-management.
Pavlov et al., "BagBoo: A Scalable Hybrid Bagging-the-Boosting Model", CIKM'10, 2010, Canada, pp. 1897-1900.
Romov et al., "RecSys Challenge 2015: ensemble learning with categorical features", Yandex Data Factory, Moscow, 4 pages.
"Allstate Claims Severity", Kaggle, 2017 2 pages (Screenshot), https://www.kaggle.com/c/allstate-claims-severity.
Schapire et al., "Boosting the Margin: a New Explanation for The Effectiveness of Voting Methods", The Annals of Statistics, 1998, vol. 26, No. 5, pp. 1651-1686.
Freund et al., "A Decision-theoretic Generalization of Online Learning and an Application to Boosting", Journal of Computer and System Sciences, 1997, vol. 5, No. 1, 35 pages.
Valentini et al., "Low Bias Bagged Support Vector Machines", Proceedings of the Twentieth International Conference on Machine Learning, USA, 2003, 8 pages.
Zhang et al., "Boosting with Early Stopping: Convergence and Consistency", The Annals of Statistics, 2005, vol. 33, No. 4, pp. 1538-1579.
Xu, Monte Carlo cross validation, Chemometrics and Intelligent Laboratory Systems 56 (2001), pp. 1-11.
Rupp, Kernel Methods for Virtual Screening, Dissertation, Frankfurt, Jan. 30, 2009, 202 pages.
Avidan, "Joint feature-basis subset selection", Mitsubishi Electric Research Labs, USA, 8 pages.
Kotsiantis, "Supervised Machine Learning: A Review of Classification Techniques", Informatica, vol. 31, 2007, pp. 249-268.
Mukhopadhyay et al., "A Syntactic Classification based Web Page Ranking Algorithm", 6th International Workshop on MSPT Proceedings, MSPT 2006, pp. 83-92.
Trofimov, "Using boosted trees for click-through rate prediction for sponsored search", Yandex, Moscow, 6 pages.
Foulds, Learning Instance Weights in Multi-Instance Learning, Thesis for the degree of Master of Science at the University of Waikato, Department of Computer Science, Feb. 2007-Feb. 2008, 182 pages.
JMP, A Business Unit of SAS, Version 9, Modeling and Multivariate Methods, SAS Institute Inc. 2010. JMP® 9 Modeling and Multivariate Methods. Cary, NC: SAS Institute Inc. JMP® 9 Modeling and Multivariate Methods Copyright © 2010, SAS Institute Inc., Cary, NC, USA, 696 pages.
Webb, "MultiBoosting: A Technique for Combining Boosting and Wagging", Machine Learning, 2000, vol. 40, pp. 159-197.
Jiang, "Novel Boosting Frameworks to Improve the Performance of Collaborative Filtering", JMLR: Workshop and Conference Proceedings, vol. 29, 2013, pp. 87-99.
U.S. Appl. No. 16/000,809, filed Jun. 5, 2018.
U.S. Appl. No. 16/000,819, filed Jun. 5, 2018.
Miyashita et al., "Convolutional Neural Networks using Logarithmic Data Representation", 2016, vol. 2 (Year: 2016).
Notice of Allowance with regard to the U.S. Appl. No. 15/263,654 mailed Jun. 28, 2019.
Office Action with regard to the counterpart U.S. Appl. No. 16/536,348 mailed Nov. 2, 2021.
Aitkenhead, "A co-evolving decision tree classification method", ScienceDirect, 2008, UK, pp. 18-25.
Office Action with regard to the counterpart U.S. Appl. No. 16/000,809 mailed Jul. 20, 2022.

\* cited by examiner

METHOD OF AND SERVER FOR CONVERTING CATEGORICAL FEATURE VALUE INTO A NUMERIC REPRESENTATION THEREOF AND FOR GENERATING A SPLIT VALUE FOR THE CATEGORICAL FEATURE

CROSS-REFERENCE

The present application claims priority to Russian Patent Application No. 2017140973, entitled "Method Of And Server For Converting Categorical Feature Value Into A Numeric Representation Thereof And For Generating A Split Value For The Categorical Feature," filed Nov. 24, 2017, the entirety of which is incorporated herein by reference.

FIELD

The present technology relates to systems and methods for generating a prediction model. In particular, the present technology relates to a method of and a system for converting a categorical feature value into a numeric representation thereof for use by the prediction model and for generating a split value for the categorical feature.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

In the search engine example, the MLA is used for generating the ranked search results. When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such the MLA is "trained" to predict relevancy of the given search result to the search query based on a plethora of "features" associated with the given search result, as well as indications of past users' interactions with search results when submitting similar search queries in the past.

As has been alluded to above, the search engines are useful when the user knows what the user is looking for (i.e. has a particular search intent in mind). There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommendation system, which system aggregates and recommends content from various social networks. The FLIPBOARD recommendation system presents the uncovered content in a "magazine style" format, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content. Another example of a recommendation system is YANDEX.ZEN™ recommendation system, which generates and presents user-personalized content to the user when the user initiates an application associated with Yandex.Zen, which can be a dedicated application or a landing page of a browser application.

In order to generate the ranked search results in a search engine system or a list of recommended resources in a typical recommendation system, the respective system utilizes the MLA the recommended content from various content sources available on the Internet.

Overview of MLAs

There are many different types of MLAs known in the art. Broadly speaking, there are three types of MLAs: supervised learning based MLAs, unsupervised learning based MLAs and reinforcement learning based MLAs.

Supervised learning MLA process is based on a target-outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data.

Examples of supervised learning based MLAs include: Regression, Decision Tree, Random Forest, Logistic Regression, etc.

Unsupervised learning MLA does not involve a target or outcome variable to predict per se. Such MLAs are used for clustering a population of values into different groups, which is widely used for segmenting customers into different groups for specific intervention. Examples of unsupervised learning MLA include: Apriori algorithm, K-means.

Reinforcement learning MLA is trained to make specific decisions. During training, the MLA is exposed to a training environment where it trains itself continually using trial and error. The MLA learns from past experience and tries to capture the best possible knowledge to make accurate decisions. Example of reinforcement learning MLA is a Markov Decision Process.

Decision tree based MLAs is an example of supervised learning type of the MLAs. This type of MLAs uses a decision tree (as a predictive model) to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees.

In order for the decision trees based MLA to work, it needs to be "built" or trained using a training set of objects containing a large plurality of training objects (such as documents, events, or the like). These training objects are "labelled" by human assessors. As an example, a human assessor can rank a given training object as "not interesting", "interesting" or "highly interesting".

Gradient Boosting

Gradient boosting is one approach to building an MLA based on decision trees, whereby a prediction model in the form of an ensemble of trees is generated. The ensemble of trees is built in a stage-wise manner. Each subsequent decision tree in the ensemble of decision trees focuses training on those previous decision tree iterations that were "weak learners" in the previous iteration(s) of the decision trees ensemble (i.e. those that are associated with poor prediction/high error).

Generally speaking, boosting is a method aimed at enhancing prediction quality of the MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the MLA first builds a first tree, then a second tree, which enhances the prediction outcome of the first tree, then a third tree, which enhances the prediction outcome of the first two trees and so on. Thus, the MLA in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

Greedy Algorithms

When generating the decision trees (using, for example, the gradient boosting approach), it is known to use greedy algorithms. A greedy algorithm is an algorithmic paradigm that follows the problem solving heuristic of making the locally optimal choice at each stage (for example, at each level of the decision tree) with an outlook of finding a global optimum. In building the decision trees, the use of the greedy algorithm can be summarized as following: for each level of the decision tree, the MLA tries to find the most optimal value (of the feature and/or the split)—this is the local optimal solution. Once the optimal value for the given node is determined, when the MLA moves to generating a lower level of the decision tree, the previously determined values for the upper nodes are "frozen"—i.e. taken "as is" for the given iteration of the decision tree in the ensemble of the decision trees.

As in a case of a single tree, each tree in the ensemble of trees is built in a greedy fashion, which means that when the MLA is selecting a feature and a split for each node of the tree, the MLA makes a selection that is locally optimal, e.g. the best for the particular node, not for the entire tree in general.

Oblivious Decision Trees

Once the best feature and split are selected for a given node, the algorithm then goes to a child node of the given node and executes the greedy selection of feature and split for that child node. In certain implementations, when selecting a feature for a given node, the MLA algorithm can not use features used in nodes on higher levels of tree depth. In other implementations, for each depth level of the MLA analyzes all possible features, regardless of whether they were used on previous levels. Such trees are called "oblivious" trees, because at each level the tree "forgets" that it used a particular feature on a previous level and considers the feature again. In order to select the best feature and split for the node, a gain function is calculated for each possible variant. The option (feature and split value) with the highest gain is selected.

Prediction Quality Parameter

When a given tree is built, in order to determine the quality of the prediction of the given tree (or a given level of the given tree, as the given tree is being built), the MLA calculates a metric (i.e. a "score"), which denotes how close the current iteration of the model, which includes the given tree (or the given level of the given tree) and preceding trees, has gotten in its prediction to the correct answers (targets). The score of the model is calculated based on the predictions made and actual target values (correct answers) of the training objects used for training.

When the first tree is built, the MLA selects values of a first feature and a first split value for a root node of the first tree and estimates the quality of such model. In order to do so, the MLA "feeds" the training objects to the first tree in a sense "descending" the training objects through the branches of the decision tree, and the so-fed training objects are split into two (or maybe more) different leafs of the first tree at the first node split (i.e. they get "categorized" by the decision tree or, more specifically, the decision tree model attempts to predict the target of the training object being descended through the decision tree model). Once all the training objects are categorized, a prediction quality parameter is calculated—in a sense determining how close the categorization of objects is to the actual values of the targets.

More specifically, knowing the target values of the training objects, the MLA calculates the prediction quality parameter (e.g. information gain or the like) for this first feature—first split node and then selects a second feature with a second split for the root node. For this second variant of feature and split for the root node, the MLA executes the same steps as it did with the first variant (the MLA feeds training objects to the tree and calculates the resulting metric using the second variant of a combination of the feature and the split for the root node).

The MLA then repeats the same process with the third, fourth, fifth, etc. features and splits variants for the root node until the MLA covers all possible variants of the feature and the split and then the MLA chooses the feature and split variant for the root node which yields the best prediction outcome (i.e. has the highest metric).

Once the feature and split variant for the root node are selected, the MLA proceeds to the child nodes of the root node and selects features and splits for the child nodes same way as it did for the root node. The process is then repeated for further child nodes of the first tree until the decision tree is built.

Then, according to the boosting approach, the MLA moves to build the second three. The second tree is aimed to enhance the prediction results of the first tree. It should "correct" prediction mistakes of the first tree. For that to occur, the second tree is built on a training object where examples, in which the first tree made prediction errors, are weighted with higher weights than examples in which the first tree rendered a correct prediction. The second tree is built similarly to how the first tree has been build.

With this approach, tens, hundreds or even thousands of threes may be consequently built. Each of the subsequent tree in the ensemble of trees enhancing prediction quality of the previous ones.

Numeric and Categorical Features

Broadly speaking, decision trees can use two types of features for analysis-numeric features and categorical features.

Examples of numeric features are: age, height, number of hits on a documents, number of times a given search query appears in a document, etc. Broadly speaking, numeric features can be binary (i.e. 0 or 1) or can be continuous (such as height, weight, etc.).

Numeric features, can be easily compared with each other. For example, where the numeric feature represents how tall a person is, they can be easily compared with each other to draw a conclusion that Person A is taller than Person B.

The numeric features can be analyzed within the tree, by comparing the numeric feature to a pre-determined value at each of the splits of the tree. For example, the numeric feature of the number of clicks, can be compared at a given split: "above 10,000?". Depending on the value of the numeric feature, the descent along the tree at the split can take a "left" or a "right" direction.

The MLA can be trained on numeric features to predict a numeric target value. For example, the MLA can be trained to predict CLICK or NO CLICK for a particular document/web resource (i.e. either 1 for click or 0 for no click).

Categorical features can be both continuously discrete (for example, breeds of dogs) and binary (for example, male/female).

A typical prior art approach, is to convert the categorical feature into a numeric representation thereof and processing the numeric representation of the categorical feature. There are various known approaches to converting categorical features into numeric representation: categorical encoding, numeric encoding, one-hot encoding, binary encoding, etc.

U.S. Pat. No. 8,572,071 (published on Oct. 29, 2013 to Pottenger et al and assigned to Rutgers, The State University of New Jersey) discloses a method and apparatus for transforming data in vector form. Each vector is composed of a set of attributes that are either boolean or have been mapped to boolean form. The vectors may or may not fall into categories assigned by a subject matter expert (SME). If categories exist, the categorical labels divide the vectors into subsets. The first transformation calculates a prior probability for each attribute based on the links between attributes in each subset of the vectors. The second transformation computes a new numeric value for each attribute based on the links between attributes in each subset of the vectors. The third transformation operates on vectors that have not been categorized. Based on the automatic selection of categories from the attributes, this transformation computes a new numeric value for each attribute based on the links between attributes in each subset of the vectors.

U.S. Pat. No. 7,113,932 (published on Sep. 26, 2006 to Tayebnejad et al. and assigned to MCI LLC) discloses a data processing system program to develop, train, and implement a neural network for identifying customers who represent a bad debt risk is disclosed. A feature vector is applied to a neural network to generate outputs that approximate the relative likelihood that customers who are the subjects of the records used to generate the feature vector will be a bad debt risk. Statistical values relating categorical attributes of the customers to the likelihood of their becoming a bad debt risk are substituted for the categorical attributes, and the attributes are normalized before the feature vector is applied to the network. In one embodiment the customers are customers of a long distance service provider.

SUMMARY

Embodiments of the present technology have been developed based on developers' appreciation of at least one technical problem associated with the prior art approaches to using categorical features in decision trees.

For the purposes of illustration, let's assume that the feature that the MLA needs to process is "music genre" and the prediction target of the function for the MLA to predict is "listened" or "not listened", based on the music genre. The feature "music genre" is categorical or, in other words, it can take one of many values—such as: jazz, classical, reggae, folk, hip hop, pop, punk, opera, country, heavy metal, rock, etc.

In order for the MLA to process the categorical feature, the categorical feature needs to be translated into a numeric value. More specifically, the value of a given categorical feature (i.e. one of jazz, classical, reggae, folk, hip hop, pop, punk, opera, country, heavy metal, rock) needs to be translated to a numeric representation thereof.

In accordance with the non-limiting embodiments of the present technology, the MLA first creates an ordered list of all training objects having categorical features to be processed during training of the MLA.

In case the training objects having categorical features have an inherent temporal relationship (for example, months of the year, years, etc.), the MLA organizes the training objects having categorical features in accordance with this temporal relationship. In case the training objects having categorical features do not have the inherent temporal relationship, the MLA organizes an ordered list of training objects having categorical features based on a rule. For example, the MLA can create a random order of training objects having categorical features. The random order becomes a proxy for temporal order of the training objects having categorical features that are not otherwise associated with inherent temporal relationship.

Using the above example of the categorical features being music genres—such training objects having categorical features may or may not be associated with the inherent temporal relationship. For example, in those scenarios, where the training objects having categorical features are associated with audio tracks played on or downloaded from an online music repository service, the training objects having categorical features may be associated with the inherent temporal relationship based on the time of playing/downloading.

Irrespective of how the order is generated, the MLA then "freezes" the training objects having categorical features in the so-organized order. The so-organized order, in a sense, can be said to specify for each one training object having categorical feature, which other training object(s) having categorical features occur "before" and which occurs "after" (even if the training objects having categorical features are not associated with the inherent temporal relationship).

With reference to FIG. 1, there is depicted a non-limiting example of an ordered list of training objects 102, the training objects being associated with categorical features (continuing with the example of the categorical features being genre of music, such as jazz, classical, reggae, folk, hip hop, pop, punk, opera, country, heavy metal, rock, etc.).

The ordered list of training objects 102 has a plurality of training objects 104. As an illustration only, the plurality of training objects 104 includes a first training object 106, a second training object 108, a third training object 110, a fourth training object 112, a fifth training object 114, a sixth training object 116, a seventh training object 118 and an eighth training object 120. Naturally, the plurality of training objects 104 may have fewer or more training objects contained therein. Each of the training objects of the plurality of training objects 104 has a categorical feature 122 associated therewith, as well as an event value 124. Using an example of the first training object 106, the categorical feature 122 associated therewith is "Pop", while the event value 124 is "0" (indicative for example, of a lack of a click during an interaction with the first training object 106 by a past user or an assessor).

To continue the description of the example illustrated in FIG. 1:
for the second training object 108, the categorical feature 122 associated therewith is "Rock", while the event value 124 is "1" (indicative for example, of a presence of a click);
for the third training object 110, the categorical feature 122 associated therewith is "Disco", while the event value 124 is "1" (indicative for example, of a presence of a click);
for the fourth training object 112, the categorical feature 122 associated therewith is "Pop", while the event value 124 is "0" (indicative for example, of a lack of a click);
for the fifth training object 114, the categorical feature 122 associated therewith is "Pop", while the event value 124 is "1" (indicative for example, of a presence of a click);
for the sixth training object 116, the categorical feature 122 associated therewith is "Jazz", while the event value 124 is "0" (indicative for example, of a lack of a click);
for the seventh training object 118, the categorical feature 122 associated therewith is "Classical", while the event value 124 is "1" (indicative for example, of a presence of a click);
for the eighth training object 120, the categorical feature 122 associated therewith is "Reggae", while the event value 124 is "1" (indicative for example, of a presence of a click).

An order of the ordered list of training objects 102 is depicted in FIG. 1 at 126. In accordance with the non-limiting embodiments of the present technology, in line with the order 126 of the ordered list of training objects 102, a given training object in the ordered list of training objects 102 can be said to occur before or after another one of the ordered list of training objects 102. For example, the first training object 106 can be said to occur before any other training object of the plurality of training objects 104. As another example, the fourth training object 112 can be said to occur (i) after the first training object 106, the second training object 108, the third training object 110 and (ii) before the fifth training object 114, the sixth training object 116, the seventh training object 118 and the eighth training object 120. As a final example, the eighth training object 120 occurs after all other training objects of the plurality of training objects 104.

In accordance with the non-limiting embodiments of the present technology, when the MLA needs to translate a given categorical feature into its numeric representation, the MLA calculates the number of appearance of the given categorical feature relative to other categorical features associated with training objects that occur before the given categorical feature in ordered list of training objects 102.

In other words and broadly speaking, the MLA generates an indication of a "count" of the given categorical feature as will be explained in greater detail herein below. To give a temporal analogy, the MLA uses only those categorical features which have happened in the "past" relative to the given categorical feature. Thus, when translating the categorical feature into the numeric representation thereof, the MLA does not "peek" into the future of the given categorical feature (i.e. targets of those categorical features that happened "in the future" relative to the given categorical feature). As such, at least some embodiments of the present technology allow at least reducing the problem of overfitting or, at the very least, delay the point where the overfitting of the MLA occurs.

In a specific implementation of the non-limiting embodiments of the present technology, the MLA calculates a function based on WINs and LOSSes associated with the categorical feature and its "past".

As an illustration, let's consider the fifth training object 114 (having the categorical feature 122 value of "Pop" and the associated event value 124 of "1"). The MLA translates the value of the categorical feature 122 (i.e. "Pop") into a numeric feature using a formula:

$$\text{Count} = \frac{Number_{WINs}}{Number_{OCCURENCEs}} \qquad \text{Formula 1}$$

Where Count is the numeric representation of a value of the categorical feature for a given object, $Number_{WINs}$ is the number of events for the given value of the categorical feature that are considered WINs and $Number_{OCCURENCEs}$ is the number of occurrences of the same value of the categorical feature that is being processed, both the number of events that are considered WINs and the number of occurrences of value of the categorical feature being prior to the place in the order 126 of the given categorical feature being processed.

As an example, the number of events that are considered WINs can be a successful occurrence of an the event associated with the given object associated with the given value of the categorical feature (i.e. the song having a particular genre associated with the given object was played or downloaded or liked), i.e. the event value 124 being "1" and not "0". The number of occurrences is the total number of occurrences of the value of the given categorical feature in the ordered list of training objects 102 that "appear" before the current occurrence (i.e. before the categorical feature that the MLA processes the count for). In other words, the system calculates the count for the given feature by only looking "backwards" along the ordered list of training objects 102. As an example, for a given feature value (rock) of a given object the number of events that are considered WINs can be the number of occurrences of objects with particular event type (e.g. the song associated with the training object was played or downloaded or liked, i.e. the event value 124 being "1" and not "0") and the number of the occurrences can be the total number of occurrences of the same feature value (rock) as in the given object.

In alternative embodiments of the present technology, Formula 1 can be modified such that instead of the Number$_{OCCURENCEs}$ for a given object being the number of occurrences of objects with the same categorical feature value in the ordered list prior to the given object, the Number$_{OCCURENCEs}$ can be the number of all objects in the order list prior to the given object, regardless of their categorical feature values.

In some non-limiting embodiments of the present technology, Formula 1 can be modified with a constant.

$$\text{Count} = \frac{Number_{WINs}}{Number_{OCCURENCEs} + R_{constant}} \quad \text{Formula 2}$$

Where the $R_{constant}$ can be a pre-determined value.

The Formula 2 can be particular useful to avoid errors in executing the calculations where the given categorical feature occurs for the first time (where there are zero prior occurrences and zero prior wins, the $R_{constant}$ allows avoiding an error due to an attempt to divide by zero).

Broadly speaking, non-limiting embodiments of the present technology can utilize any formula, as long as occurrences of the WINs and the total number of occurrences are used from the "past" of the current categorical feature being processed.

As such, broadly speaking, the formula can be represented as:

$$f(\text{Number\_WINs\_PAST}, \text{Number\_Occurences\_PAST}) \quad \text{Formula 3}$$

In some embodiments of the present technology, the MLA can calculate, for a value of a given categorical feature for a given object, a plurality of counters. For example, each counter of the plurality of counters can be calculated using Formula 2 having a different $R_{constant}$. More specifically, a first counter of the plurality of counters can be calculated using Formula 2 having a first $R_{constant}$ and a second counter of the plurality of counters can be calculated using Formula 2 having a second $R_{constant}$. Alternatively, a first counter of the plurality of counters can be calculated using Formula 1 having Number$_{OCCURENCEs}$ represent all prior occurrences of the same categorical feature and a second counter of the plurality of counters can be calculated using Formula 1 having Number$_{OCCURENCEs}$ represent all prior occurrences of all categorical features.

In alternative non-limiting embodiments of the present technology, any one of the Formulas 1, 2 or 3 can be modified to analyze a group of features rather than a single feature.

For example, rather than just looking at the genre of the song, the formula can analyze co-occurrence of the given genre and the given singer (as examples of two categorical features or a group of categorical features that can be associated with a single training object). When analyzing groups of categorical features, the MLA applies a "dynamic boosting" paradigm. As is the case with processing a single categorical feature, when the MLA processes a group of features, the MLA only analyzes co-occurrence of the group of feature that occur before the current occurrence of the group of categorical features being analyzed (i.e. the MLA does not "look ahead" in the ordered list of features).

The formula can be modified as follows:

$$\text{Count} = \frac{Number_{WINs}(F1 \text{ and } F2)}{Number_{OCCURENCEs}(F1 \text{ and } F2)} \quad \text{Formula 4}$$

Where both the Number$_{WINs}$(F1 and F2) and the Number$_{OCCURENCEs}$(F1 and F2) are considering the wins and co-occurrences of the group of features (F1 and F2) values that occur before the current occurrence of the group of features in the ordered list of training objects 102.

As the number of features grows (for example, for the training objects being a song, the categorical features may include: genre, singer, album, etc.), so does the number of possible combinations within groups of features values to be processed by the MLA for the purposes of training and then, eventually, applying the trained MLA formula.

Depending on the type of training objects, the number of combinations can grow exponentially. Thus, it can become prohibitive, from a stand point of processing resources, to calculate counts for all possible combinations of the categorical features and/or categorical feature values. Rather than pre-calculating, for a given object, all the possible combinations of the categorical features values, non-limiting embodiments of the present technology contemplate generating combination counters of features "inside" the MLA algorithm, as the algorithm goes through the categorical features values (i.e. "on the fly" when the MLA builds the decision tree (at a given iteration thereof) rather than pre-calculating all possible counters for all possible combinations of categorical features). The main technical advantage of this approach is that the MLA needs to calculate only those combination that actually occur, rather than every possible combination of categorical features and/or categorical feature values.

For example, rather than calculating counters (i.e. numeric representation) for every possible combination of genre and singer, the MLA can calculate counters (i.e. numeric representation) for only those categorical feature value combinations that the MLA encounters in the ordered list of training objects 102, saving significantly on processing resources and memory required to store the information about each possible combination of categorical features.

Broadly speaking, when the MLA builds a particular iteration of the decision tree model (for example, a particular decision tree in an ensemble of decision trees that are trained during execution of the gradient boosting approach). For each node of the decision tree, the MLA translates the categorical features (or groups of categorical features, as the case may be) into numeric representation thereof as has been described above.

Once, for the given node or the given level, a best one of the so-translated categorical features has been selected (as well as any other numeric features that may be processed by the given node)—it is "frozen" for that node/that level of the decision tree at the given iteration of the decision tree boosting. In some embodiments of the present technology, when the MLA descends to lower level nodes, the MLA only calculates counters for those combinations of categorical features that the MLA has encountered for the current variation of the decision tree (i.e. taking into account the categorical features that have been selected as best and "frozen" at higher levels of the decision trees).

In alternative embodiments of the present technology, when the MLA descends to lower level nodes, the MLA only calculates counters for those combinations of categorical features that the MLA has encountered for the current variation of the decision tree (i.e. taking into account the categorical features that have been selected as best and "frozen" at higher levels of the decision tree), as well as previous variations of the decision trees built during previous iteration of the boosting of the decision trees as part of building the ensemble of decision trees.

Taking an example of the current level in the decision tree being a third level (i.e. the third level that is preceded by a root node, a first level and a second level of the decision tree), when the MLA calculates the categorical features' numeric representation for the third level, the MLA calculates all possible combinations of the categorical features for the third level in combination with the "frozen" categorical features that have been selected as best and "frozen" for the root node, the first level and second level nodes.

In other words, it can be said that for a given node of a given level of the decision tree, the MLA calculates the "counters" of the possible categorical features for the given node of the given level of the decision tree by adding all possible categorical features to the already selected best categorical features that have been "frozen" at previous levels relative to the given level of the decision tree.

Now, turning our attention how the splits are selected in associated with the given categorical feature (or, more specifically, its counter) at the given level of the decision tree. The splits are also calculated "inside" the MLA algorithm, i.e. "on the fly" when the MLA builds the decision tree (at a given iteration thereof) rather than pre-calculating all possible splits for all possible counters.

In a specific embodiment of the present technology, the MLA generates the splits by generating a range of all possible values for the splits (for a given counter having been generated based on the given categorical feature) and applying a pre-determined grid. In some embodiments of the present technology, the range can be between 0 and 1. In other embodiments of the present technology, which is especially pertinent when a coefficient ($R_{constant}$) is applied to calculating the values of the counts, the range can be between: (i) the value of the coefficient and (ii) the value of coefficient plus one.

In some embodiments of the present technology, the pre-determined grid is a regular interval grid, which parses the range into regular intervals. In other embodiments of the present technology, the pre-determined grid is an irregular interval grid, which parses the range into irregular intervals.

As a result of not pre-processing all possible categorical feature combinations and processing counters "inside" the MLA algorithm, it is also impossible to process splits for the nodes "inside" the MLA building the decision tree model. In accordance with the non-limiting embodiments of the present technology, the MLA defines splits for the tree nodes without knowing all possible values for the counters based on the above-described approach using grids. The MLA generates a range of feature combination and splits it into equal "buckets" and the edges of the buckets become values for the splits. In use, the MLA needs to determine which bucket a given counter "falls"—which becomes the value of the split.

In some embodiments of the present technology, the MLA calculates the splits for each level of the decision tree and, once the given level of the decision tree is optimized (i.e. once the MLA has selected the "best" feature and split for the given level of the decision tree), the MLA erases the calculated splits. When the MLA gets to the next level, the MLA re-calculates the splits anew. In other embodiments of the present technology, the splits are calculated and "forgotten" on per-decision-tree basis and not on a per-level basis.

When the MLA builds a decision tree at a particular iteration of the decision tree model building, for each level, the MLA tests and optimizes the best of: which feature to place at the node of the level and which split value (out of all possible pre-defined values) to place at the node.

In accordance with a first broad aspect of the present technology, there is provided a method of converting a categorical feature value into a numeric representation thereof, the categorical feature being associated with a training object used for training a Machine Learning Algorithm (MLA). The MLA is executable by a machine learning system to predict a target value for an in-use object. The method comprises: accessing, from a non-transitory computer-readable medium of the machine learning system, a set of training objects, each training object of the set of training object containing a document and an event indicator associated with the document, each document being associated with a categorical feature; generating a set of models for the MLA, each model of the set of models being based on an ensemble of decision trees; for each model of the set of models: organizing the set of training objects into a respective ordered list of training objects, the respective ordered list of training objects being organized such that for each given training object in the respective ordered list of training objects there is at least one of: (i) a preceding training object that occurs before the given training object and (ii) a subsequent training object that occurs after the given training object; when building a given iteration of a decision tree in a given ensemble of decision trees: selecting one of the set of models and the respective ordered list; generating a decision tree structure using the one of the set of models; when processing a given categorical feature using the decision tree structure, the given categorical feature associated with a given training object, the given training object having at least one preceding training object in the ordered list of training objects, generating a numeric representation thereof, the generating based on: (i) a number of total occurrences of the at least one preceding training object with a same categorical feature value in the respective ordered list; and (ii) a number of pre-determined outcomes of events associated with at least one preceding training object having the same categorical feature value in the respective ordered list.

In some implementations of the method, the generating comprises applying a formula:

$$Count = \frac{Number_{WINs}}{Number_{OCCURENCEs}}$$

where:
$Number_{OCCURENCEs}$ is the number of total occurrences of the at least one preceding training object with a same categorical feature value; and
$Number_{WINs}$ is the number of pre-determined outcomes of events associated with at least one preceding training object having the same categorical feature value.

In some implementations of the method, the generating comprises applying a formula:

$$Count = \frac{Number_{WINs}}{Number_{OCCURENCEs} + R_{constant}}$$

where:
$Number_{OCCURENCEs}$ is the number of total occurrences of the at least one preceding training object with a same categorical feature;
$Number_{WINs}$ is the number of pre-determined outcomes of events associated with at least one preceding training object having the same categorical feature; and
$R_{constant}$ is a pre-determined value.

In some implementations of the method, the given categorical feature comprises a set of categorical features that includes at least a first categorical feature and a second categorical feature, and wherein generating the numeric representation thereof comprises: (i) using as the number of total occurrences of the at least one preceding training object with the same categorical feature value: a number of total occurrences of the at least one preceding training object having both the first categorical feature value and the second categorical feature value; and (ii) using as the number of the pre-determined outcomes of events associated with at least one preceding training object having the same categorical feature value: a number of the pre-determined outcomes of events associated with at least one preceding training object having both the first categorical feature value and the second categorical feature value.

In some implementations of the method, the generating the numeric representation thereof comprises applying a formula:

$$Count = \frac{Number_{WINs}(F1 \text{ and } F2)}{Number_{OCCURENCEs}(F1 \text{ and } F2)},$$

where
(i) the $Number_{WINs}$(F1 and F2) is the number of total occurrences of the at least one preceding training object with the same set of categorical features values; and
(ii) $Number_{OCCURENCEs}$(F1 and F2) is the number of the pre-determined outcomes of events associated with at least one preceding training object having the same set of categorical features values.

In some implementations of the method, the event indicator has a pre-determined value, the pre-determined value being one of a positive outcome and a negative outcome.

In some implementations of the method, the organizing the set of training objects into the ordered list of training objects is executed at a point in time prior to the generating of the numeric value.

In some implementations of the method, the training objects are associated with an inherent temporal order, and wherein the organizing the set of training objects into the ordered list of training objects comprises organizing the training objects in accordance with the temporal order.

In some implementations of the method, the training objects are not associated with an inherent temporal order, and wherein the organizing the set of training objects into the ordered list of training objects comprises organizing the training objects in accordance with a pre-determined rule.

In some implementations of the method, the training objects are not associated with an inherent temporal order, and wherein the organizing the set of training objects into the ordered list of training objects comprises generating a random order of the training objects to be used as the ordered list.

In some implementations of the method, the method further comprises using the decision tree structure for the other ones of the set of models for the given iteration of the decision tree.

In some implementations of the method, the method further comprises filling each one of the set of models using the set of training objects, the values of categorical features of documents having been converted to numeric representations thereof using the respective ordered list of training objects.

In some implementations of the method, the set of models comprises a set of proto-models, and wherein the set of models further comprises a production model, and wherein the method further comprises: at each iteration of training, selecting a best performing one of the set of proto-models, and using the best performing one of the set of proto-models for generating a decision tree of the production model for the iteration of training.

In some implementations of the method, the method further comprises determining the best performing one of the set of proto-models by applying a verification algorithm.

In some implementations of the method, the verification algorithm takes into accounts performance of the given iteration of each of the set of models and previous decisions trees in the associated one of the set of models.

In some implementations of the method, the use of different respective ordered sets results in values in leafs of different ones of the set of models being at least partially different.

In some implementations of the method, the use of the set of different models with an associated respective ordered lists results in reducing an overfitting effect during training.

In some implementations of the method, any one of the ordered lists is different from others of the ordered lists.

In accordance with another broad aspect of the present technology, there is provided a method of converting a categorical feature value into numeric representation thereof, the categorical feature being associated with a training object used for training a Machine Learning Algorithm (MLA). The MLA is executable by an electronic device to predict a value for an in-use object. The method comprises: accessing, from a non-transitory computer-readable medium of the machine learning system, a set of training objects, each training object of the set of training object containing a document and an event indicator associated with the document, each document being associated with a categorical feature; generating a set of models for the MLA, each model of the set of models being based on an ensemble of decision trees; for each model of the set of models: organizing the set of training objects into a respective ordered list of training objects, the respective ordered list of training objects being organized such that for each given training object in the respective ordered list of training objects there is at least one of: (i) a preceding training object that occurs before the given training object and (ii) a subsequent training object that occurs after the given training object; when building a given iteration of a decision tree in a given ensemble of decision trees: selecting one of the set of models and the respective ordered list; generating a decision tree structure using the one of the set of models; when processing a given categorical feature using the decision tree structure, for a given categorical feature, the given categorical feature associated with a given training object, the given training object having at least one preceding training object in the respective ordered list of training objects, generating a numeric representation thereof, the generating comprising calculating a function using a formula:

$$f(\text{Number\_WINs\_PAST}, \text{Number\_Occurence\_PAST})$$

where,

Number_WINs_PAST comprises a number of pre-determined outcomes of events associated with at least one preceding training object having the same categorical feature values in the respective ordered set; and Number_Occurence_PAST comprises a number of total occurrences of the at least one preceding training object with a same categorical feature value in the respective ordered set.

In accordance with yet another broad aspect of the present technology, there is provided a server configured to execute a Machine Learning Algorithm (MLA), the MLA being based on a decision tree prediction model based on a decision tree, the decision tree for processing a categorical feature value by converting it into a numeric representation thereof, the categorical feature being associated with a training object used for training a Machine Learning Algorithm (MLA). The MLA is executable by the server to predict a target value for an in-use object. The server comprises: a non-transitory computer-readable medium; a processor coupled to the non-transitory computer-readable medium, the processor configured to: access, from the non-transitory computer-readable medium of the machine learning system, a set of training objects, each training object of the set of training object containing a document and an event indicator associated with the document, each document being associated with a categorical feature; generate a set of models for the MLA, each model of the set of models being based on an ensemble of decision trees; to generate, the processor being further configured to, for each model of the set of models: organize the set of training objects into a respective ordered list of training objects, the respective ordered list of training objects being organized such that for each given training object in the respective ordered list of training objects there is at least one of: (i) a preceding training object that occurs before the given training object and (ii) a subsequent training object that occurs after the given training object; when building a given iteration of a decision tree in a given ensemble of decision trees, the processor being further configure to: select one of the set of models and the respective ordered list; generate a decision tree structure using the one of the set of models; when processing a given categorical feature using the decision tree structure, for a given categorical feature, the given categorical feature associated with a given training object, the given training object having at least one preceding training object in the ordered list of training objects, generate a numeric representation thereof, the generating based on: (i) a number of total occurrences of the at least one preceding training object with a same categorical feature value; and (ii) a number of pre-determined outcomes of events associated with at least one preceding training object having the same categorical feature value.

In accordance with yet another broad aspect of the present technology, there is provided a method of converting a value of a categorical feature into a numeric representation thereof, the categorical feature being associated with a training object used for training a Machine Learning Algorithm (MLA), the MLA using a decision tree model having a decision tree, the training object being processed in a node of a given level of the decision tree, the decision tree having at least one prior level of the decision tree, the at least one prior level having at least one prior training object having at least one categorical feature value having been converted to a prior numeric representation thereof for the at least one prior level of the decision tree. The MLA is executable by an electronic device to predict a value for an in-use object. The method comprises: accessing, from a non-transitory computer-readable medium of the machine learning system, a set of training objects, each training object of the set of training object contains a document and an event indicator associated with the document, each document being associated with a categorical feature; generating the numeric representation of the categorical feature value by: retrieving the prior numeric representation of the at least one prior categorical feature value for a given object of the set of training objects at the at least one prior level of the decision tree; generating, for each combination of the at least one prior categorical feature value at the at least one prior level of the decision tree and at least some of the categorical features values of the set of training objects, a current numeric representation for the given level of the decision tree, the generating being done in-line with generating the decision tree.

In some implementations of the method, the set of training objects is organized in an ordered list such that: for each given training object in the ordered list of training objects there is at least one of: (i) a preceding training object that occurs before the given training object and (ii) a subsequent training object that occurs after the given training object, and wherein the at least some of the categorical features values are those categorical features values associated with training objects that appear earlier in the ordered list of training objects.

In some implementations of the method, the generating is executed for only those prior categorical feature values that have been generated at the at least one prior level of the decision tree.

In some implementations of the method, the generating is executed for only those prior categorical feature values that have been generated at the at least one prior level of the decision tree and at least one previous iteration of the decision tree.

In some implementations of the method, the event indicator has a pre-determined value, the pre-determined value being one of a positive outcome and a negative outcome.

In some implementations of the method, the method further comprises organizing the set of training objects into the ordered list of training objects.

In some implementations of the method, the organizing the training objects into the ordered list of training objects is executed at a point in time prior to the generating of the numeric value.

In some implementations of the method, the organizing the set of training objects into the ordered list of training objects comprises organizing a plurality of sets of ordered lists and wherein the method further comprises, prior to the generating of the numeric value selecting a given one of the plurality of sets of ordered lists.

In some implementations of the method, the training objects are associated with an inherent temporal order, and wherein the organizing the set of training objects into the ordered list of training objects comprises organizing the training objects in accordance with the temporal order.

In some implementations of the method, the training objects are not associated with an inherent temporal order, and wherein the organizing the set of training objects into the ordered list of training objects comprises organizing the training objects in accordance with a pre-determined rule.

In some implementations of the method, the training objects are not associated with an inherent temporal order, and wherein the organizing the set of training objects into the ordered list of training objects comprises generating a random order of the training objects to be used as the ordered list.

In yet another broad aspect of the present technology, there is provided a server configured to execute a Machine Learning Algorithm (MLA), the MLA being based on a decision tree prediction model based on a decision tree, the decision tree being configured to process a categorical feature value by converting it into a numeric representation thereof, the categorical feature being associated with a training object used for training a Machine Learning Algorithm (MLA), the training object being processed in a node of a given level of the decision tree, the decision tree having at least one prior level of the decision tree, the at least one prior level having at least one prior training object having at least one categorical feature value having been converted to a prior numeric representation thereof for the at least one prior level of the decision tree. The server comprises: a non-transitory computer-readable medium; a processor coupled to the non-transitory computer-readable medium, the processor configured to: access, from a non-transitory computer-readable medium of the machine learning system, a set of training objects, each training object of the set of training object contains a document and an event indicator associated with the document, each document being associated with a categorical feature; generate the numeric representation of the categorical feature value by: retrieving the prior numeric representation of the at least one prior categorical feature value for a given object of the set of training objects at the at least one prior level of the decision tree; generating, for each combination of the at least one prior categorical feature value at the at least one prior level of the decision tree and at least some of the categorical features values of the set of training objects, a current numeric representation for the given level of the decision tree, the generating being done in-line with generating the decision tree.

In some implementations of the server, the set of training objects is organized in an ordered list such that: for each given training object in the ordered list of training objects there is at least one of: (i) a preceding training object that occurs before the given training object and (ii) a subsequent training object that occurs after the given training object, and wherein the at least some of the categorical features values are those categorical features values associated with training objects that appear earlier in the ordered list of training objects.

In some implementations of the server, to generate the numeric representation of the categorical feature values, the processor is configured to execute generating for only those prior categorical feature values that have been generated at the at least one prior level of the decision tree.

In some implementations of the server, to generate the numeric representation of the categorical feature value, the processor is configured to execute generating for only those prior categorical feature values that have been generated at the at least one prior level of the decision tree and at least one previous iteration of the decision tree.

In some implementations of the server, the event indicator has a pre-determined value, the pre-determined value being one of a positive outcome and a negative outcome.

In some implementations of the server, the processor is configured to organize the set of training objects into the ordered list of training objects.

In some implementations of the server, to organize the training objects into the ordered list of training objects, the processor is configured to execute organizing at a point in time prior to executing the generating of the numeric value.

In some implementations of the server, to organize the set of training objects into the ordered list of training objects, the processor is configured to organize a plurality of the set of ordered lists and wherein the processor is further configured, prior to the generating of the numeric value, to select a given one of the set of ordered list.

In some implementations of the server, the training objects are associated with an inherent temporal order, and wherein to organize the set of training objects into the ordered list of training objects, the processor is configured to organize the training objects in accordance with the temporal order.

In some implementations of the server, the training objects are not associated with an inherent temporal order, and wherein to organize the set of training objects into the ordered list of training objects, the processor is configured to organize the training objects in accordance with a pre-determined rule.

In some implementations of the server, the training objects are not associated with an inherent temporal order, and wherein to organize the set of training objects into the ordered list of training objects, the processor is configured to generate a random order of the training objects to be used as the ordered list.

In accordance with yet another broad aspect of the present technology, there is provided a method of generating a split value for a node in a decision tree of a decision tree model used by a Machine Learning Algorithm (MLA), the split value being for a node at a particular level of the decision tree, the node for classifying an object having a categorical feature value that is to be translated into a numeric value representative thereof, the split is for causing the object to be classified in one of child nodes of the node based on the numeric value and the split value, the MLA executable by an electronic device to predict a value for an in-use object. The method comprises: generating a range of all possible values of the categorical features; applying a grid to the range to separate the range into region, each region having a boundary; using the boundary as the split value; the generating and the applying being executed before the categorical feature value is translated into the numeric representation thereof.

In some implementations of the method, the grid has a pre-determined format.

In some implementations of the method, the grid is a regular interval grid.

In some implementations of the method, the grid is an irregular interval grid.

In some implementations of the method, the range is between zero and one.

In some implementations of the method, the numeric representations of the categorical feature values are calculated using an $R_{constant}$ and wherein the range is between $R_{constant}$ and $1+(R_{constant})$.

In some implementations of the method, the method further comprises, during an in-use phase, for a given counter value representing a categorical feature, determining which bucket defined by the grid the given counter value falls into and using the associated boundaries as values for splits.

In some implementations of the method, the using the boundary as the split value is executed for each level of the decision tree and wherein the method further comprises, once a given level of the decision tree is trained, re-calculating the split value.

In some implementations of the method, the using the boundary as the split value is executed for each decision tree and wherein the method further comprises, once a given decision tree is trained, re-calculating the split value.

In some implementations of the method, the using the boundary as the split value is executed during training of the MLA and wherein the training of the MLA, during a given iteration of one of: (i) a given level of the decision and (ii) a given iteration of the decision tree, comprises: selecting a best value of a feature to be placed at the given iteration and a best value of the split associated therewith.

In accordance with yet another broad aspect of the present technology, there is provided a server configured to execute a Machine Learning Algorithm (MLA), the MLA being based on a decision tree of a decision tree model, the decision tree having a node, the node having a split value, the node being of a given level of the decision tree, the node is for classifying an object having a categorical feature that is to be translated into a numeric value representative thereof, the split is for causing the object to be classified in one of child nodes of the node based on the numeric value and the split value. The server comprises: a non-transitory computer-readable medium; a processor coupled to the non-transitory computer-readable medium, the processor configured to: generate a range of all possible values of the categorical features; apply a grid to the range to separate the range into region, each region having a boundary; using the boundary as the split value; the generating and the applying being executed before the categorical feature is translated into the numeric representation thereof.

In some implementations of the server, the grid has a pre-determined format.

In some implementations of the server, the grid is a regular interval grid.

In some implementations of the server, the grid is an irregular interval grid.

In some implementations of the server, the range is between zero and one.

In some implementations of the server, the numeric representation of the categorical feature value is calculated using an $R_{constant}$ and wherein the range is between $R_{constant}$ and $1+(R_{constant})$.

In some implementations of the server, the processor is further configured to, during an in-use phase, for a given counter value representing a categorical feature, determine which bucket defined by the grid the given counter value falls into and use the associated boundaries as values for splits.

In some implementations of the server, to use the boundary as the split value, the processor is configured to use the boundary as the split value for each level of the decision tree and wherein the processor is further configured, once a given level of the decision tree is trained, to re-calculate the split value.

In some implementations of the server, to use the boundary as the split value, the processor is configured to use the boundary as the split value for each iteration of the decision tree and wherein the processor is further configured, once a given iteration of the decision tree is trained, to re-calculate the split value.

In some implementations of the server, to use the boundary as the split value, the processor is configured to use the boundary as the split value during training of the MLA and wherein to train of the MLA, during a given iteration of one of: (i) a given level of the decision and (ii) a given iteration of the decision tree, the processor is further configured to: select a best value of a feature to be placed at the given iteration and a best value of the split associated therewith.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
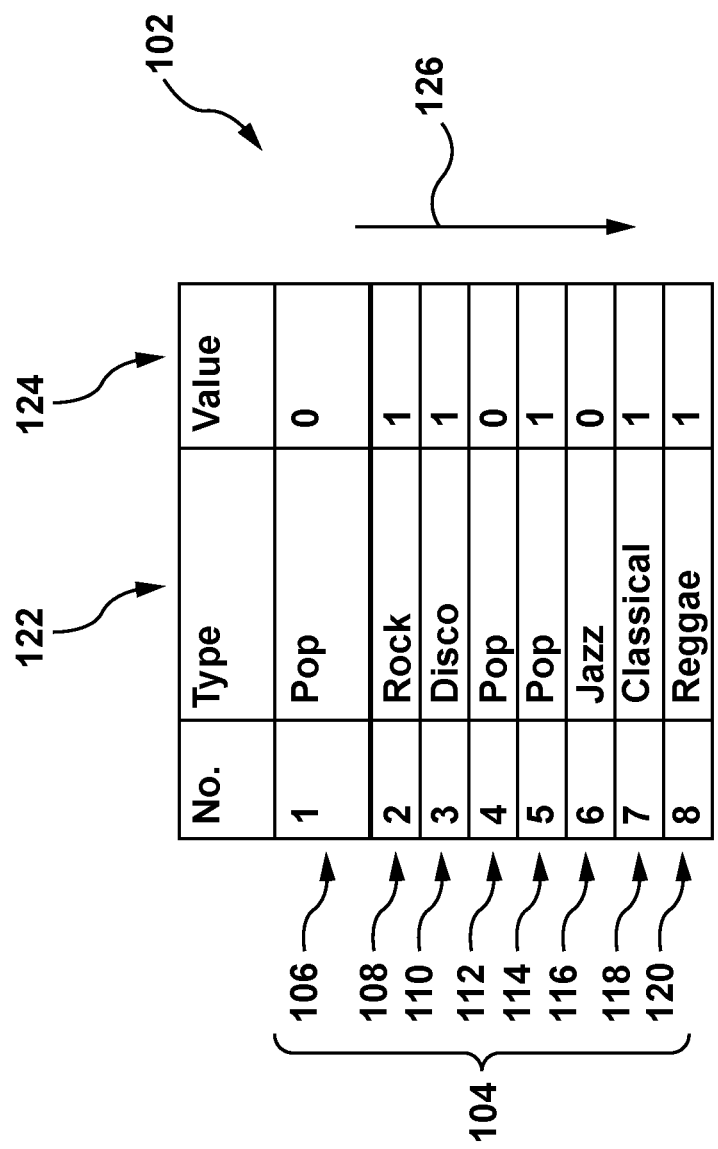
FIG. 1 depicts a non-limiting example of an ordered list of training objects, the training objects being associated with categorical features, the ordered list of training objects being implemented in accordance with the non-limiting embodiments of the present technology.

It should also be noted that, unless otherwise explicitly specified herein, the drawings are not to scale.

An Appendix A is provided at the end of the present specification. The Appendix A includes a copy of a yet to be published article entitled "CatBoost: gradient boosting with categorical features support". This article provide additional background information, description of implementations of the non-limiting embodiments of the present technology, as well as some additional examples. The entirety of this article is incorporated herein by reference in their entirety, in all those jurisdictions where such incorporation by reference is allowed.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the Figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology. It is noted that at least some embodiments of the present technology may help reduce the overfitting effect or, at the very least, delay the point when overfitting occurs.

Figure 4:
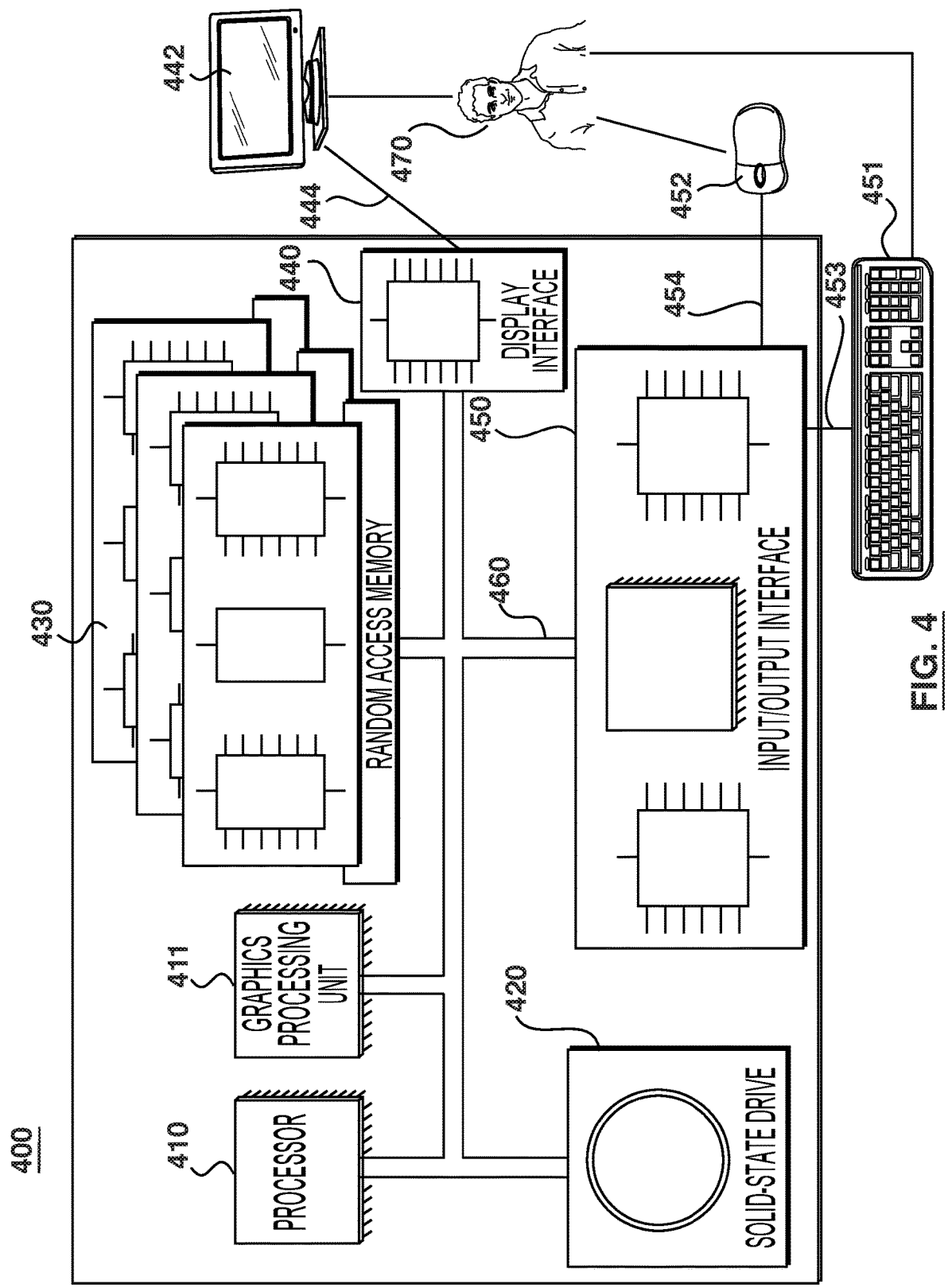
FIG. 4 is a diagram of a computer system suitable for implementing the present technology and/or being used in conjunction with implementations of the present technology.

Referring to FIG. 4, there is shown a computer system 400 suitable for use with some implementations of the present technology, the computer system 400 comprising various hardware components including one or more single or multi-core processors collectively represented by processor 410, a graphics processing unit (GPU) 411, a solid-state drive 420, a random access memory 430, a display interface 440, and an input/output interface 450.

Communication between the various components of the computer system 400 may be enabled by one or more internal and/or external buses 460 (e.g. a PCI bus, universal serial bus, IEEE 1394 "Firewire" bus, SCSI bus, Serial-ATA bus, etc.), to which the various hardware components are electronically coupled. The display interface 440 may be coupled to a monitor 442 (e.g. via an HDMI cable 144) visible to a user 470, and the input/output interface 450 may be coupled to a touchscreen (not shown), a keyboard 451 (e.g. via a USB cable 453) and a mouse 452 (e.g. via a USB cable 454), each of the keyboard 451 and the mouse 452 being operable by a user 470.

According to implementations of the present technology, the solid-state drive 420 stores program instructions suitable for being loaded into the random access memory 130 and executed by the processor 410 and/or the GPU 411 for processing activity indications associated with a user. For example, the program instructions may be part of a library or an application.

Figure 5:
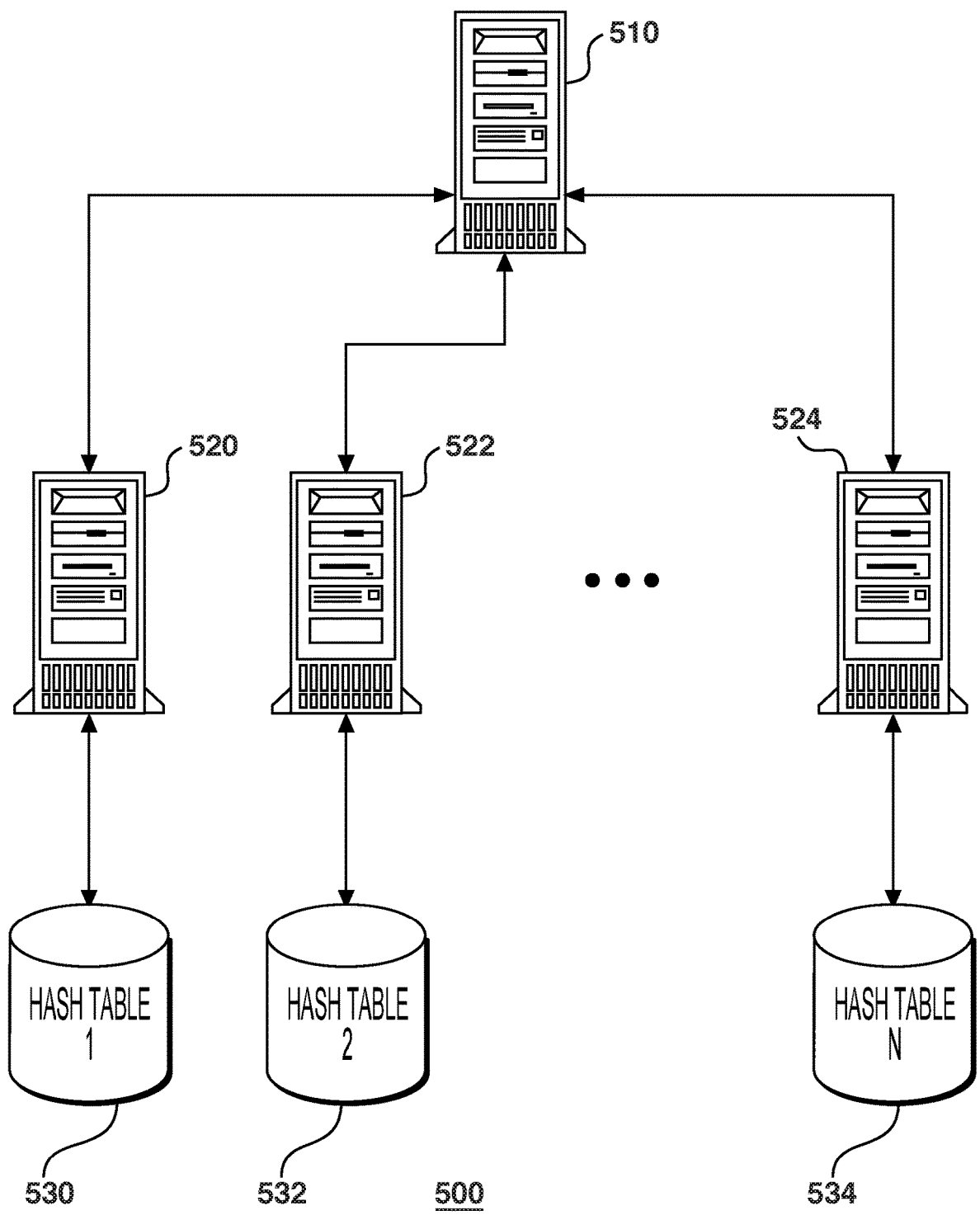
FIG. 5 is a diagram of a networked computing environment in accordance with an embodiment of the present technology.

In FIG. 5, there is shown a networked computing environment 500 suitable for use with some implementations of the present technology, the networked computing environment 500 comprising a master server 510 in communication with a first slave server 520, a second slave server 522 and a third slave server 524 (also referred to as the slave servers 520, 522, 524 hereinafter) via a network (not depicted) enabling these systems to communicate. In some non-limiting embodiments of the present technology, the network can be implemented as the Internet. In other embodiments of the present technology, the network may be implemented differently, such as any wide-area communications network, local-area communications network, a private communications network and the like.

The networked computing environment 500 may contain more or fewer slave servers without departing from the scope of the present technology. In some embodiments, no "master server-slave server" configuration may be required, a single server may be sufficient. The number of servers and the type of architecture is therefore not limitative to the scope of the present technology. The master server-slave server architecture depicted in FIG. 5 is particularly useful (but not so limited) in those scenarios, where it is desirable to have parallel processing of some or all routines that will be described below.

In one embodiment, a communication channel (not depicted) between the master server 510 and/or the slave servers 520, 522, 524 may be established to allow data exchange. Such data exchange may occur on a continuous basis or, alternatively, upon occurrence of certain events. For example, in the context of crawling webpages and/or processing a search query, a data exchange may occur as a result of the master server 510 overseeing the training of machine-learning models by the networked computing environment.

In some embodiments, the master server 510 may receive a set of training objects and/or a set of testing objects and/or a set of features from a frontend search engine server (not depicted) and send the set of training objects and/or the set of testing objects and/or the set of features to one or more of the slave servers 520, 522, 524. Once received from the master server 510, the one or more slave servers 520, 522, 524 may process the set of training objects and/or the set of test objects and/or the set of features in accordance with the non-limiting embodiments of the present technology to generate one or more machine-learning models, each one of the machine-learning models comprising, in some instances, one or more tree models. In some embodiments, the one or more tree models model an association between the document and the target (the target can be a parameter of interest, a relevancy score, etc.).

A generated machine-learning model may be transmitted to the master server 510 so that the master server 510 may generate a prediction, for example in the context of a search query received from the frontend search engine server, based on the search query received from an electronic device associated with a user wishing to execute a computer-based search. Upon applying the generated machine-learning model to the search query, the master server 510 may transmit one or more corresponding results to the frontend search engine server. In some alternative embodiments, the one or more slave servers 520, 522, 524 may directly host the generated machine-learning model and process the search query received from the frontend search engine server through the master server 510 or directly from the frontend search engine.

The master server 510 can be implemented as a conventional computer server and may comprise some or all of the features of the computer system 400 depicted at FIG. 4. In an example of an embodiment of the present technology, the master server 510 can be implemented as a Dell™ PowerEdge™ Server running the Microsoft™ Windows Server™ operating system. Needless to say, the master server 510 can be implemented in any other suitable hardware and/or software and/or firmware or a combination thereof. In the depicted non-limiting embodiment of present technology, the master server 510 is a single server. In alternative non-limiting embodiments of the present technology, the functionality of the master server 210 may be distributed and may be implemented via multiple servers.

The implementation of the master server 510 is well known to the person skilled in the art of the present technology. However, briefly speaking, the master server 510 comprises a communication interface (not depicted) structured and configured to communicate with various entities (such as the frontend search engine server and/or the slave servers 520, 522, 524, for example and other devices potentially coupled to the network) via the network. The master server 510 further comprises at least one computer processor (e.g., a processor 410 of the master server 510) operationally connected with the communication interface and structured and configured to execute various processes to be described herein.

The general purpose of the master server 510 is to coordinate the generation of machine-learning models by the slave servers 520, 522, 524. As previously described, in an embodiment, the set of training objects and/or the set of testing objects and/or the set of features may be transmitted to some or all of the slave servers 520, 522, 524 so that the slave servers 520, 522, 524 may generate one or more machine-learning models based on the set of training objects and/or the set of testing objects and/or the set of features. In some embodiments, a machine-learning model may comprise one or more tree models. Each one of the tree models may be hosted on one of the slave servers 520, 522, 524. In some alternative embodiments, the tree models may be hosted on at least two of the slave servers 520, 522, 524. As a person skilled in the art of the present technology will appreciate, where the machine-learning model and/or the tree models forming the machine-learning model are hosted is not critical to the present technology and many variations may be envisioned without departing from the scope of the present technology.

In some embodiments, once the slave servers 520, 522, 224 host the one or more generated machine-learning model, the slave servers 520, 522, 524 may receive instructions to conduct associations between a document and a target, the document being a different object from the training objects of the set of training objects and comprising a set of features corresponding to values associated with some features selected from the set of features defining a structure of at least one of the tree model.

Once the association between the document and the target has been completed by the slave servers 520, 522, 524, the master server 510 may receive, from the slave servers 520, 522, 524, the target to be associated with the document. In some other embodiments, the master server 510 may be limited to sending a document and/or the set of features associated with the document without receiving any target in return. This scenario may occur upon determination by one or more of the slave servers 520, 522, 524 that the document and/or the set of features associated with the document leads to modification of one of the tree models hosted on the slave servers 520, 522, 524.

In some embodiments, the master server 510 may comprise logic which may generate instructions to modify the one or more tree models hosted at the slave servers 520, 522, 524 along with a target to be associated with the document. In such instances, one of the tree models hosted by the slave servers 520, 522, 524 may be modified so that the document may be associated with the target in the tree model. In some embodiments, once one of the tree models hosted by the slave servers 520, 522, 524 has been modified, the slave servers 520, 522, 524 may transmit a message to the master server 510, the message being indicative of a modification made to one of the tree models. Other variations as how the master server 510 interacts with the slave servers 520, 522, 524 may be envisioned without departing from the scope of the present technology and may become apparent to the person skilled in the art of the present technology. In addition, it should be also expressly understood that in order to simplify the description presented herein above, the configuration of the master server 510 has been greatly simplified. It is believed that those skilled in the art will be able to appreciate implementational details for the master server 510 and for components thereof that may have been omitted for the purposes of simplification of the description.

The slave servers 520, 522, 524 can be implemented as conventional computer servers and may comprise some or all of the features of the computer system 400 depicted at FIG. 4. In an example of an embodiment of the present technology, the slave servers 520, 522, 524 can be implemented as a Dell™ PowerEdge™ Server running the Microsoft™ Windows Server™ operating system. Needless to say, the slave servers 520, 522, 524 can be implemented in any other suitable hardware and/or software and/or firmware or a combination thereof. In the depicted non-limiting embodiment of present technology, the slave servers 520, 522, 524 operate on a distributed architecture basis. In alternative non-limiting embodiments, a single slave server may be relied upon to operate the present technology.

The implementation of the slave servers 520, 522, 524 is well known to the person skilled in the art of the present technology. However, briefly speaking, each one of the slave servers 520, 522, 524 may comprise a communication interface (not depicted) structured and configured to communicate with various entities (such as the frontend search engine server and/or the master server 510, for example and other devices potentially coupled to the network) via the network. Each one of the slave servers 520, 522, 524 further comprises at least one computer processor (e.g., similar to the processor 410 depicted at FIG. 4) operationally connected with the communication interface and structured and configured to execute various processes to be described herein. Each one of the slave servers 520, 522, 524 further may comprise one or more memories (e.g., similar to the solid-state drive 420 and/or the random access memory 430 depicted at FIG. 4).

The general purpose of the slave servers 520, 522, 524 is to generate the one or more machine-learning models. As previously described, in an embodiment, the machine-learning models may comprise one or more tree models. Each one of the tree models comprises a set of features (which may also be referred to as a subset of features if the features forming the subset has been selected from a set of features). Each feature of the set of features corresponds to one or more nodes of a corresponding tree model.

During the generation of the one or more machine-learning models, the slave servers 520, 522, 524 may rely on the set of training objects and/or the set of testing objects to select and organise the features so as to generate a tree model. This process of selecting and organizing the features may be repeated throughout multiple iterations so that the slave servers 520, 522, 524 generate multiple tree models, each one of the tree models corresponding to a different selection and/or organization of the features. In some embodiments, the set of training objects and/or the set of testing objects and/or the set of features may be received from the master server 510 and/or the frontend server. Once the machine-learning models have been generated, the slave servers 520, 522, 524 may transmit to the master server 510 an indication that the machine-learning models have been generated and may be relied upon to generate predictions, for example, but without being limitative, in the context of classifying documents during a "web crawling" process and/or upon processing a search query received from through the frontend search engine server and/or for generating personalized content recommendations.

In some embodiments, the slave servers 520, 522, 524 may also receive a document and a set of features associated with the document along with a target to be associated with the document. In some other embodiments, the slave servers 520, 522, 524 may not transmit any target to the master server 510. This scenario may occur upon determination by the slave servers 520, 522, 524 that the target to be associated with the document leads to a modification of one of the tree models that they host.

In some embodiments, once one of the tree models hosted by the slave servers 520, 522, 524 has been modified, the slave servers 520, 522, 524 may transmit a message to the master server 510, the message being indicative of a modification made to one of the tree models. Other variations as how the slave servers 520, 522, 524 interact with the master server 510 may be envisioned without departing from the scope of the present technology and may become apparent to the person skilled in the art of the present technology. In addition, it should be also expressly understood that in order to simplify the description presented herein above, the configuration of the slave servers 520, 522, 524 has been greatly simplified. It is believed that those skilled in the art will be able to appreciate implementational details for the slave servers 520, 522, 524 and for components thereof that may have been omitted for the purposes of simplification of the description.

Still referring to FIG. 5, the slave servers 520, 522, 524 may each be communicatively coupled to, respectively, a "hash table 1" database 530, a "hash table 2" database 532 and a "hash table n" database 534 (referred to as "the databases 530, 532, 534" hereinafter). The databases 530, 532, 534 may be part of the slave servers 520, 522, 524 (e.g., stored in the memories of the slave servers 520, 522, 524 such as the solid-state drive 420 and/or the random access memory 430) or be hosted on distinct database servers. In some embodiments, a single database accessed by the slave servers 520, 522, 524 may be sufficient. The number of databases and the arrangement of the databases 530, 532, 534 are therefore not limitative to the scope of the present technology. The databases 530, 532, 534 may be used to access and/or store data relating to one or more hash tables representative of machine-learning models such as, but without being limited thereto, tree models generated in accordance with the present technology.

In some embodiments of the present technology, each one of the databases 530, 532, 534 stores the same set of information (i.e. the same information is stored on all of the databases 530, 532, 534). For example, each of the databases 530, 532, 534 can store the same set of training objects. This is particularly useful (but not so limited) in those embodiments of the present technology, where the arrangement of the master server 510 and/or the slave servers 520, 522, 524 is used for parallel processing and building of the decision trees. In this arrangement, each of the slave server 520, 522, 524 has access to the same set of training objects.

In some embodiments, the databases 530, 532, 534 may be accessed by the slave servers 520, 522, 524 to identify a target to be associated with the document further to the processing of set of features associated with the document by the slave servers 520, 522, 524 in accordance with the present technology. In some other embodiments, the databases 530, 532, 534 may be accessed by the slave servers 520, 522, 524 to store a new entry (also referred to as a "hashed complex vector" and/or "key" hereinafter) in the one or more hash tables, the new entry having been generated further to the processing of the set of features associated with the document and being representative of a target to be associated with the document. In such embodiments, the new entry may be representative a modification made to a tree models model by the hash table. Even though FIG. 5 illustrates an embodiment wherein the databases 530, 532, 534 comprise hash tables, it should be understood that alternative embodiments as to how machine-learning models may be stored may be envisioned without departing from the scope of the present technology.

Figure 6:
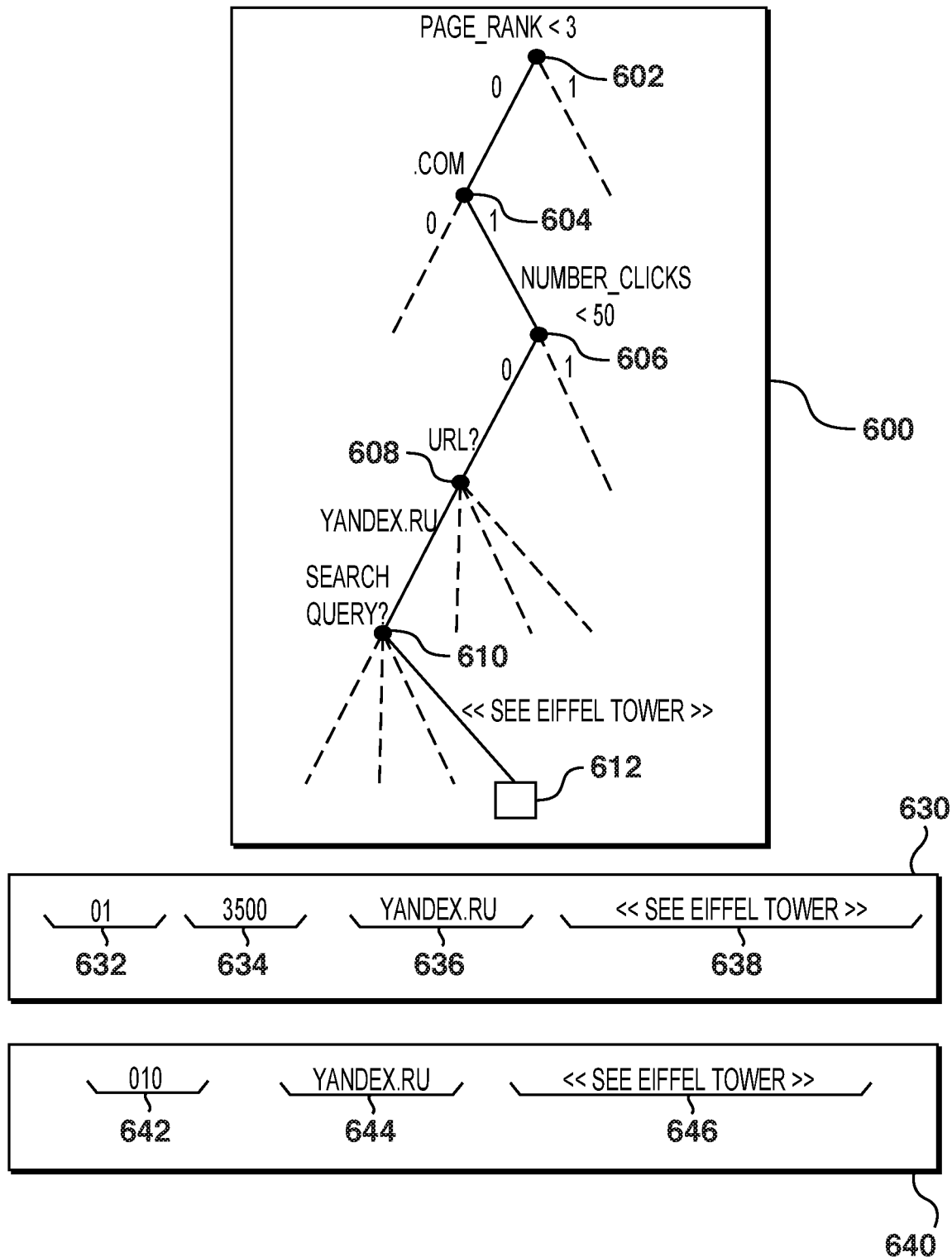
FIG. 6 is a diagram illustrating a partial tree model and two exemplary feature vectors in accordance with an embodiment of the present technology.
Figure 7:
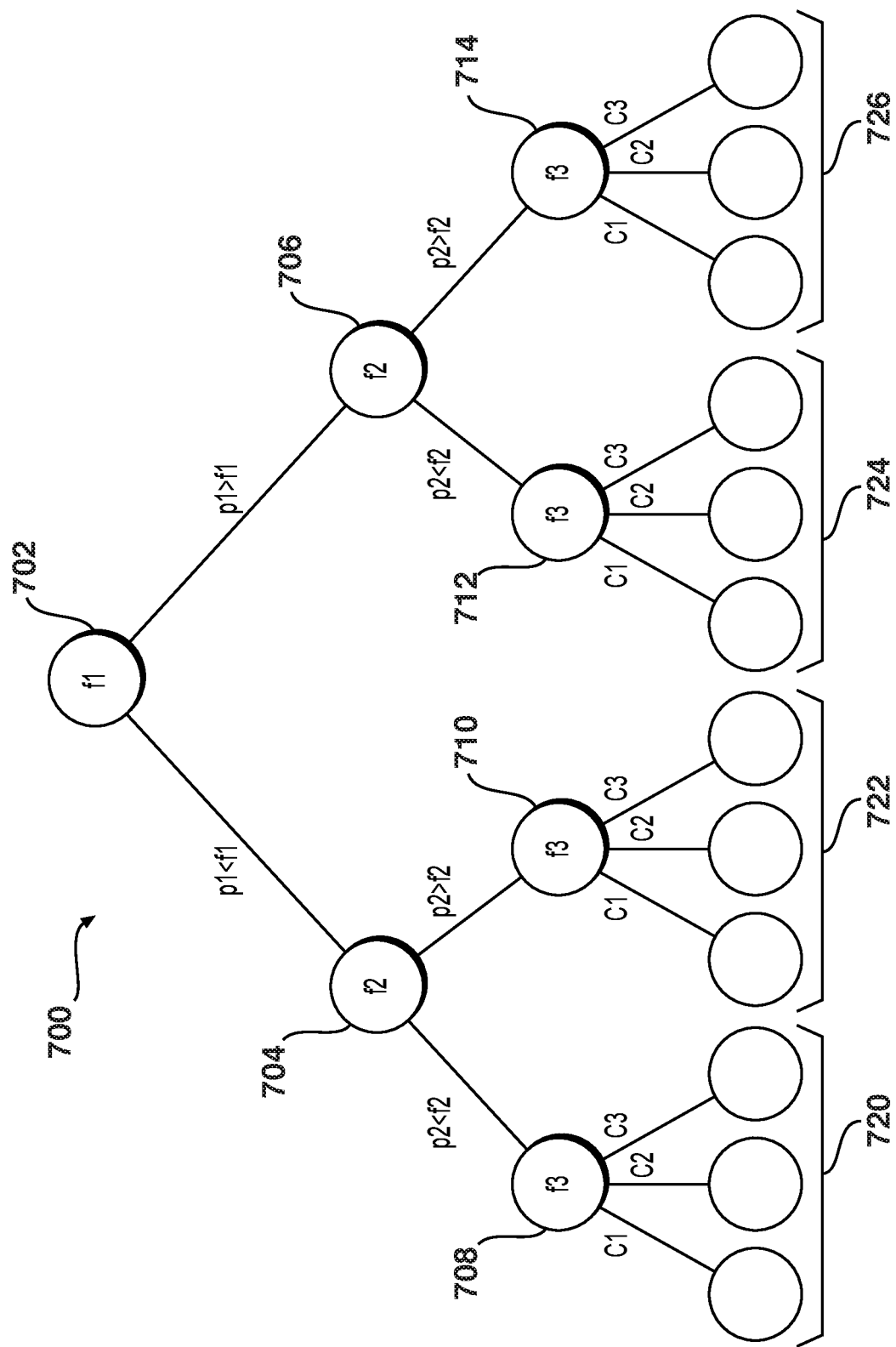
FIG. 7 is a diagram illustrating a complete tree model in accordance with an embodiment of the present technology.
Figure 8:
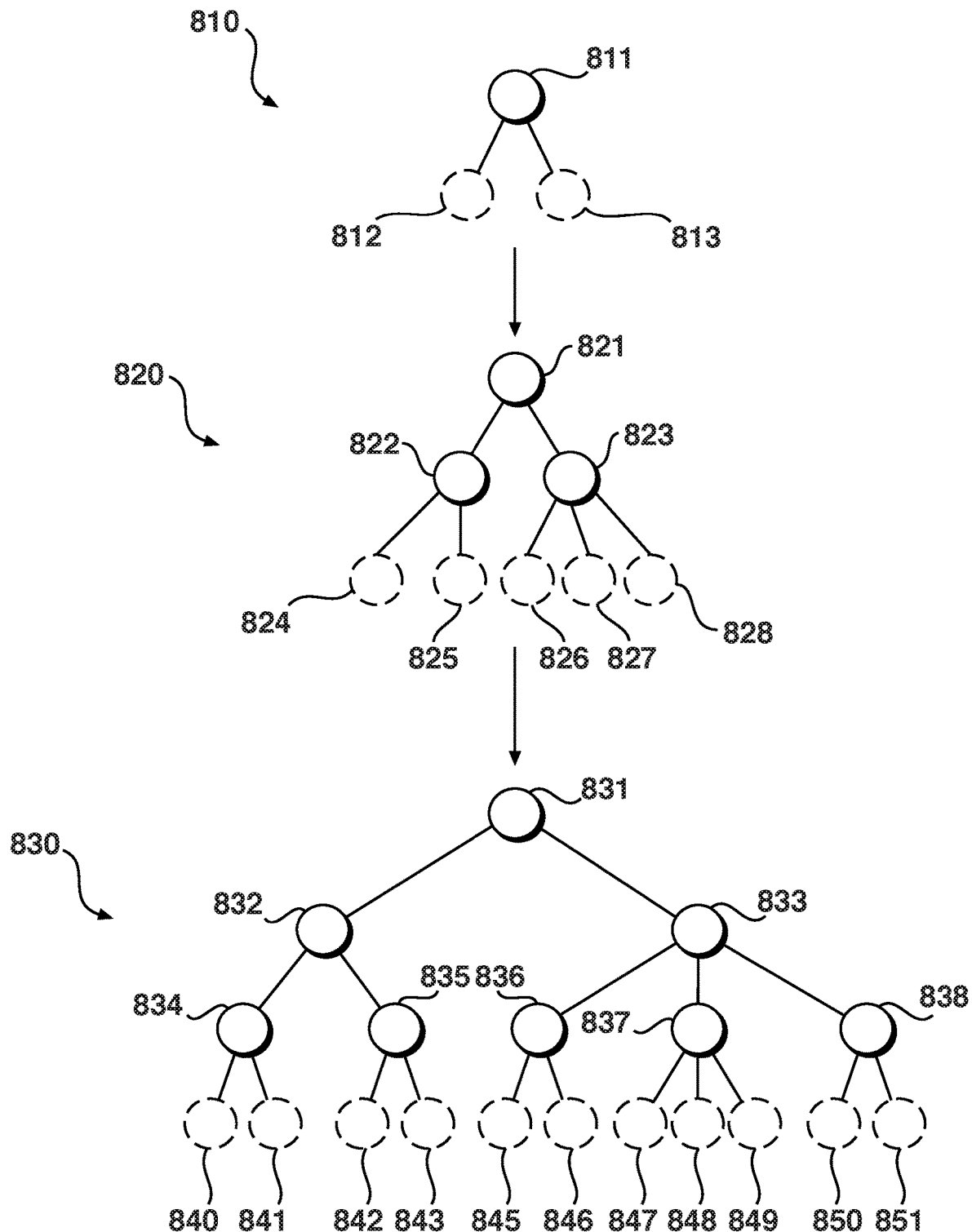
FIG. 8 is a diagram illustrating portions of a preliminary tree model and a complete preliminary tree model in accordance with another embodiment of the present technology.

We will now turn out attention to how the tree models forming a machine-learning model are processed will be provided in connection with the description of FIGS. 6 to 8.

Turning now to FIG. 6, a partial tree model 600, a first set of features 630 and a second set of features 640 are depicted. The first set of features 630 and the second set of features 640 may equally be referred to as feature vectors. The partial tree model 600 may have been generated in accordance with the present technology and may model an association between a document and a target. The tree model 600 may be referred to as a machine-learning model or a portion of a machine-learning model (e.g., for implementations wherein the machine-learning model relies on multiple tree models). In some instances, the tree model 600 may be referred as a prediction model or a portion of a prediction model (e.g., for implementations wherein the prediction model relies on multiple tree models).

The document may take multiple forms and formats to represent documents of various natures, such as, but without being limitative, text files, text documents, web pages, audio files, video files and so on. The document may equally be referred to as a file without departing from the scope of the present technology. In an embodiment, the file may be a document searchable by a search engines. However, multiple embodiments may be envisioned without departing from the scope of the present technology and may become apparent to the person skilled in the art of the present technology.

As previously discussed, the target may take multiple forms and formats to represent an indication of an order or ranking of a document such as a "click-through rate (CTR)", for example, but without being limitative. In some embodiments, the target may be referred to as a label and/or a ranking, in particular in the context of search engines. In some embodiments, the target may be generated by a machine-learning algorithm using a training document. In some alternative embodiments, other methods may be used such as, but without being limitative manually defining the target. How the target is generated is therefore not limitative and multiple embodiments may be envisioned without departing from the scope of the present technology and may become apparent to the person skilled in the art of the present technology.

A path throughout the partial tree model 600 may be defined by the first set of features 630 and/or the second set of features 640. The first set of features 630 and the second set of features 640 may be associated with a same document or with different documents. The partial tree model 600 comprises multiple nodes each connected to one or more branches. In the embodiment depicted at FIG. 6, a first node 602, a second node 604, a third node 606, a fourth node 608 and a fifth node 610 are depicted.

Each one of the first node 602, the second node 604, the third node 606, the fourth node 608 and the fifth node 610 is associated with a condition thereby defining a so-called split.

The first node 602 is associated with a condition "if Page_rank<3" associated with two branches (i.e., true represented by a binary number "1" and false represented by a binary number "0"), the second node 604 is associated with a condition "Is main page?" associated with two branches (i.e., true represented by a binary number "1" and false represented by a binary number "0"), the third node 606 is associated with a condition "if Number_clicks<5,000" associated with two branches (i.e., true represented by a binary number "1" and false represented by a binary number "0"), the fourth node 608 is associated with a condition "which URL?" associated with more than two branches (i.e., each one of the branches is associated with a different URL, for example, the URL "yandex.ru") and the fifth node 610 is associated with a condition "which Search query?" associated with more than two branches (i.e., each one of the branches is associated with a different search query, for example, the search query "See Eiffel Tower").

In an embodiment, each one of the conditions set forth above may define a distinct feature (i.e., the first node 602 is defined by the condition "if Page_rank<3", the second node 604 is defined by the condition "Is main page?", the third node 606 is defined by the condition "if Number_clicks<5,000", the fourth node 608 is defined by the condition "which URL?" and the fifth node 610 is defined by the condition "which Search query?"). In addition, the fifth node 610, via the branch "See Eiffel Tower" is associated with a leaf 612. In some embodiments, the leaf 612 may be indicative of a target.

As a result of the above-described configuration, the tree model 600 defined by the specific selection and organisation of the first node 602, the second node 604, the third node 606, the fourth node 608 and the fifth node 610 may be used to associate a document (such as, for example, but without being limitative, a web page in the html format) with the target associated with the leaf 612, the association being defined by a path through the partial tree model 300 based on the first set of features 630 and/or the second set of features 640.

It should be appreciated that for purpose of clarity, the partial tree model 600 only represents a portion of a complete tree model. The person skilled in the art of the present technology may appreciate that the number of nodes, branches and leafs is virtually unlimited and solely depends on a complexity of the tree model to be built. In addition, in some embodiments, the tree model may be a pure binary—comprising a set of nodes each comprising only two branches (i.e., true represented by a binary number "1" and false represented by a binary number "0").

However, the present technology is not limited to such tree models and multiple variations may be envisioned by the person skilled in the art of the present technology, such as for example, a tree model comprising a first portion defining a binary tree model and a second portion defining a categorical tree model as exemplified by the tree model 600 (e.g., a first portion defined by the first node 602, the second node 604 and the third node 606 and a second portion defined by the fourth node 608 and the fifth node 610).

The first set of features 630 illustrates an example of features defining the path illustrated by the tree model 600. The set of features 630 may be associated with the document and allows defining the path in the tree model 600 described in the paragraph above. At least one of the features of the set of features may be of binary type and/or of real number type (e.g., integer number type, floating number type).

In the example of FIG. 6, the set of features comprises a first component 632 associated with a value "01" and a second component 634 associated with a value "3500". Even though the term "component" is used in the present description, it should be understood that the term "variable" may be equally used and may therefore be considered as being an equivalent to "component". The first component 632 comprises the binary sequence "01" which, once projected in the tree model 600, allows establishing a first portion of the path. In the example of FIG. 6, the first portion of the path is established by applying a first binary digit "0" of the sequence "01" to the first node 602 and then a second binary digit "1" of the sequence "01" to the second node 604. The second component 634, once project in the tree model 600, allows establishing a second portion of the path. In the example of FIG. 6, the second portion of the path is established by applying the number "3500" to the third node 606".

Even though the example of FIG. 6 illustrates the first data as comprising the first component 632 and the second component 634, the number of components and the number of digits comprised by one of the components is not limitative and many variations may be envisioned without departing from the scope of the present technology.

In the example of FIG. 6, the first set of features also comprises a third component 636 associated with a value "yandex.ru" and a fourth component 638 associated with a value "See Eiffel Tower". The third component 636 and the fourth component 638 may be of category type. In some embodiments, third component 636 and the fourth component 638 may also be referred to as categorical features and may comprise, for example, but without being limitative, a host, an URL, a domain name, an IP address, a search query and/or a key word.

In some embodiments, the third component 636 and the fourth component 638 may be broadly described as comprising feature value allowing categorisation of information. In some embodiments, the third component 636 and the fourth component 638 may take the form of a chain and/or string of characters and/or digits. In yet some embodiments, the third component 636 and the fourth component 638 may comprise a parameter that may take more than two values, as it is the case in the example of FIG. 6 thereby resulting in the tree model 600 having as many branches connected to a given node as a number of possible values of the parameter.

Multiple variations as to what the third component 636 and the fourth component 638 may comprise is not limitative and many variations may be envisioned without departing from the scope of the present technology. In some embodiments, the third component 636 and the fourth component 638 may represent a path in a non-binary portion of the tree model as it is the case in the example depicted at FIG. 6. Other variations may also be possible without departing from the scope of the present technology.

The third component 636 comprises a string of character "yandex.ru" which, once projected in the tree model 600, allows establishing a fourth portion of the path. In the example of FIG. 6, the fourth portion of the path is established by applying the string of character "yandex.ru" to the fourth node 608. The fourth component 638, once projected in the tree model 600, allows establishing a fifth portion of the path. In the example of FIG. 6, the fifth portion of the path is established by applying the string of character "See Eiffel Tower" to the fifth node 610 thereby leading to the leaf 612 and the target associated therewith. Even though the example of FIG. 6 illustrates the third component 636 and the fourth component 638, the number of components and the number of digits and/or characters comprised by one of the components is not limitative and many variations may be envisioned without departing from the scope of the present technology.

Turning now to the second set of features 640, the second set of features 640 illustrates another example of features defining the path illustrated by the tree model 600. As for the first set of features 630, the second set of features 640 may be associated with the document and allows defining the path in the tree model 600 described in the above. The second set of features 640 is similar on all aspects to the first set of features 630 with the exception that the second set of features 640 comprises a first component 642 instead of the first component 632 and the second component 634 of the first set of features 630.

The first component 642 comprises a sequence of digits "010" whereas the first component 632 is associated with the value "01" and the second component 634 is associated with the value "3500". As a person skilled in the art of the present technology may appreciate, in the first component 642, the value "3500" has been represented by a binary digit "0" which is the output of the value "3500" applied to the condition associated with the third node 606 (i.e., Number_clicks<5,000"). As a result, the first component 642 may be considered as an alternative representation to the first component 632 and the second component 634 of a same path in the tree model 600.

As a result, in some embodiments, a real number value may be translated into a binary value in particular for cases where a node of a tree model to which the integer value is to be applied corresponds to a binary section of the tree model. Other variations may also be possible and the example of the second set of features 640 should not be construed as being limitative of the scope of the present technology. The second set of features 640 also comprise a second component 644 and a third component 646 that are identical to the third component 636 and the fourth component 638 of the first set of features 630.

Turning now to FIG. 7, an example of a complete tree model 700 is depicted. The tree model 700 aims at illustrating a generic tree model which may be modified so as to meet the requirements of a specific prediction model. Such modifications may include, for example but without being limitative, adding or removing one or more level of the tree, adding or removing nodes (i.e., features and the associated splits), adding or removing branches connecting the nodes and/or the leafs of the tree.

The tree model 700 may be part of a machine-learning model or be the machine-learning model. The tree model 700 may be a preliminary tree model or a trained tree model.

In some embodiments, the tree model 700 may, once generated, be updated and/or modified to improve, for example, a level of accuracy of the machine-learning model and/or a scope of application of the machine-learning model. In some embodiments, the tree model 700 may be relied upon to process, for example, but without being limited to, search engine requests or personalized content recommendations. Other fields in which the tree model 700 may be relied upon may also be envisioned without departing from the scope of the present technology.

The tree model 700 comprises a first node 702 associated with a first feature "f1". The first node 702 defines a first level of the model tree 700. The first node 702 is connected through branches to a second node 704 and a third node 706. The second node 704 and the third node 706 are both associated with a second feature "f2". The second node 704 and the third node 706 define a second level of the tree model 700. In an embodiment, the first feature "f1" and the split for the first feature "f1" have been selected amongst a set of features to be positioned at a first level of the model tree 700 on the basis of a set of training objects. More details regarding how the selection of the features from a set of features and the associated splits is made will be provided in the sections below.

The first feature "f1" is defined so that, for a given object, a value of a parameter associated with the first feature "f1" determines whether the object is to be associated with the second node 704 or the third node 706. As an example, if the value is less than a value "f1" then the object is associated with the second node 704. As another example, if the value is more than the value "f1" then the object is associated with the third node 706.

In turn, the second node 704 is associated with a fourth node 708 associated with a third feature "f3" and a fifth node 710 associated with the third feature "f3". The third node 706 is associated with a sixth node 712 associated with the third feature "f3" and a seventh node 714 associated with the third feature "f3". The fourth node 708, the fifth node 710, the sixth node 712 and the seventh node 714 define a third level of the tree model 700. As previously described in connection with the first node 702, for a given object, a value of a parameter associated with the second feature "f2" determines whether the object is to be associated with the fourth node 708 or the fifth node 710 (if the object is associated with the second node 704) or the sixth node 712 or the seventh node 714 (if the object is associated with the third node 706).

In turn, each one of the fourth node 708, the fifth node 710, the sixth node 712 and the seventh node 714 are associated with sets of predicted parameters. In the example illustrated at FIG. 7, the sets of predicted parameters comprise a first set 720, a second set 722, a third set 724 and a fourth set 726. Each one of the sets of predicted parameters comprises three targets, namely "C1", "C2" and "C3".

As a person skilled in the art of the present technology may appreciate, the tree model 700 illustrates an embodiment wherein a particular level of the tree model 700 is associated with one feature. In the example of FIG. 7, a first level comprises the first node 702 and is associated with the first feature "f1"; a second level comprises the second node 704 and the third node 706 and is associated with the second feature "f2"; and a third level comprises the fourth node 708, the fifth node 710, the sixth node 712 and the seventh node 714 and is associated with the third feature "f3".

In other words, in the embodiment of FIG. 7, the first level is associated with the first feature "f1", the second level is associated with the second feature "f2" and the third level is associated with the third feature "f3". Other embodiments may however be envisioned. In particular, an alternative embodiment wherein a generated tree model may include distinct features for a given level of the tree model. For example, a first level of such tree model may comprise a first node associated with a first feature "f1", a second level may comprise a second node associated with a second feature "f2" and a third node associated with a third feature "f3". As a person skilled in the art of the present technology may appreciate, other variations as to which features may be associated with a given level may be envisioned without departing from the scope of the present technology.

The relevant steps taken to build an embodiment of a trained decision tree prediction model (also referred to as a "trained decision tree", "tree model" and/or a "tree decision model") will be discussed with respect to FIG. 8, FIG. 9 and FIG. 10.

FIG. 8 illustrates steps in the generation of an embodiment of the trained decision tree prediction model. FIG. 9 and FIG. 10 illustrate sets of proto-trees (also referred to as "preliminary tree models" or "preliminary decision tree prediction models") used for choosing a first feature and a second feature features to be used in an embodiment of the trained decision tree prediction model.

It should be noted that the term "proto-tree" is used broadly herein. In some embodiments of the present technology, the term "proto-tree" is used to describe a partially built/partially trained decision tree, for example, as the decision tree is built "level by level". In other embodiments of the present technology, the term "proto-tree" is used to describe a trained decision tree within an ensemble of decision trees, as the ensemble of decision trees is being built in accordance with the gradient boosting techniques, for example.

In FIG. 8, a progression of building the trained decision tree prediction model based on a set of objects is illustrated. It should be noted that the following description of the trained decision tree prediction model as presented in FIG. 8 is only one non-limiting embodiment of the trained decision tree prediction model and it is contemplated that other non-limiting embodiments may have more or fewer nodes, features, levels and leaves.

Illustrated by a first decision tree 810, the trained decision tree prediction model generation begins by choosing a first feature, associated here with a first node 811. The method by which the features at each level are chosen will be discussed in more detail below.

There are two leaves 812 and 813 at the end of the paths of the first decision tree 810 branching from the first node 811. Each of the leaves 812 and 813 has "leaf values" which are associated with a predicted value of the target at the given level of building of the decision tree. In some embodiments, the first feature "f1" has been selected for the first level node 811 of the decision tree 810 on the basis of the set of training objects based on a leaf accuracy parameter and/or an accuracy parameter of the decision tree 810. The leaf accuracy parameter and/or an accuracy parameter of the decision tree 810 is calculated by means of determining a prediction quality parameter, as will be discussed in greater detail herein below.

More specifically, the first feature "f1" and the associated split have been selected from all possible features and all possible associated splits based on the so-generated prediction quality parameter.

A second feature "f2" is next chosen and added to the decision tree 810, producing a decision tree 820. A second node 822 and a third node 823 associated with the second feature are added to the two branches extended from the first node 811. In an alternative embodiment, the second node 822 and the third node 823 may be associated with distinct features.

In the embodiments illustrated at FIG. 8, the first node 811 remains the same in the decision tree 820 as in the decision tree 810, because the first feature was chosen and fixed at the first level and associated with the first node 811 (based on the gradient boosting approach).

Leaves 824 to 828 are now associated with ends of paths of the decision tree 820. The second node 822 has two leaves, a leaf 824 and a leaf 825, branching from the second node 822. The third node 823 has three leaves, a leaf 826, a leaf 827 and a leaf 828 branching from the third node 823. The numbers of leaves branching from any given node may depend, for example, on features chosen at any given node and features of the training objects upon which the model tree is generated.

Just like with the first feature "f1" a prediction quality parameter is used to select the second feature "f2" and the associated splits for the second node 822 and the third node 823.

As also illustrated in FIG. 8, a third feature "f3" is then chosen and added to the decision tree 820, producing a decision tree 830. The first node 811, the second node 822 and the third node 823 remain the same as they are in the decision tree 810 and the decision tree 820. The first feature and the second feature (and their associated splits) also remain the same as they have been previously chosen and fixed.

New nodes 834-838 are added to branches descending from the second node 822 and the third node 823. New leaves 840-851, associated with ends of paths of the decision tree 830, branch from the new nodes 834-838. Each one of the new leaves 840-851 has a corresponding leaf value associated with one or more predicted values. In this example embodiment, three features have been chosen during the generation of the trained decision tree prediction model. It is contemplated that different embodiments of trained decision tree prediction models could have more or fewer than three features. It should be appreciated that the tree model under generation may have more or fewer than three levels constructed in the above described way.

The manner in which the features are chosen for a trained decision tree prediction model, such as that illustrated in FIG. 7 and FIG. 8, will now be discussed with respect to FIG. 9 and FIG. 10.

In order to choose a "best" feature for the first feature, a set of "proto-trees" having a first node are created. In FIG. 9, three proto-trees 910, 920 and 930 are illustrated as representative samples from the set of proto-trees. In each different one of the proto-trees 910, 920 and 930, a first node is associated with a different feature from the set of available features. For example, a node 911 from the proto-tree 910 is associated with one of the features, "fa", while a node 921 of the proto-tree 920 is associated with the feature "fb" and while a node 931 of the proto-tree 930 is associated with the feature "fn". In some embodiments, there is one proto-tree created for each of the features from which the first level feature is to be chosen. Each proto-tree is a different decision tree, although they may be discarded after selection of the best feature to use at the first level node.

In some implementations of the present technology, features such as the feature "fa", the feature "fb" and the feature "fn" will be associated with features which are numerical and/or categorical. As such, instead of having two leaves per node as would be the case for a decision tree using only binary, many leaves (and branches to which additional nodes may be added) are possible. For example as illustrated in FIG. 9, the proto-tree 910 comprising the node 911 has branches into three leaves 912-914, while the proto-tree 920 and the proto-tree 930 have two leaves 922, 923 and four leaves 932-935, respectively.

Figure 9:
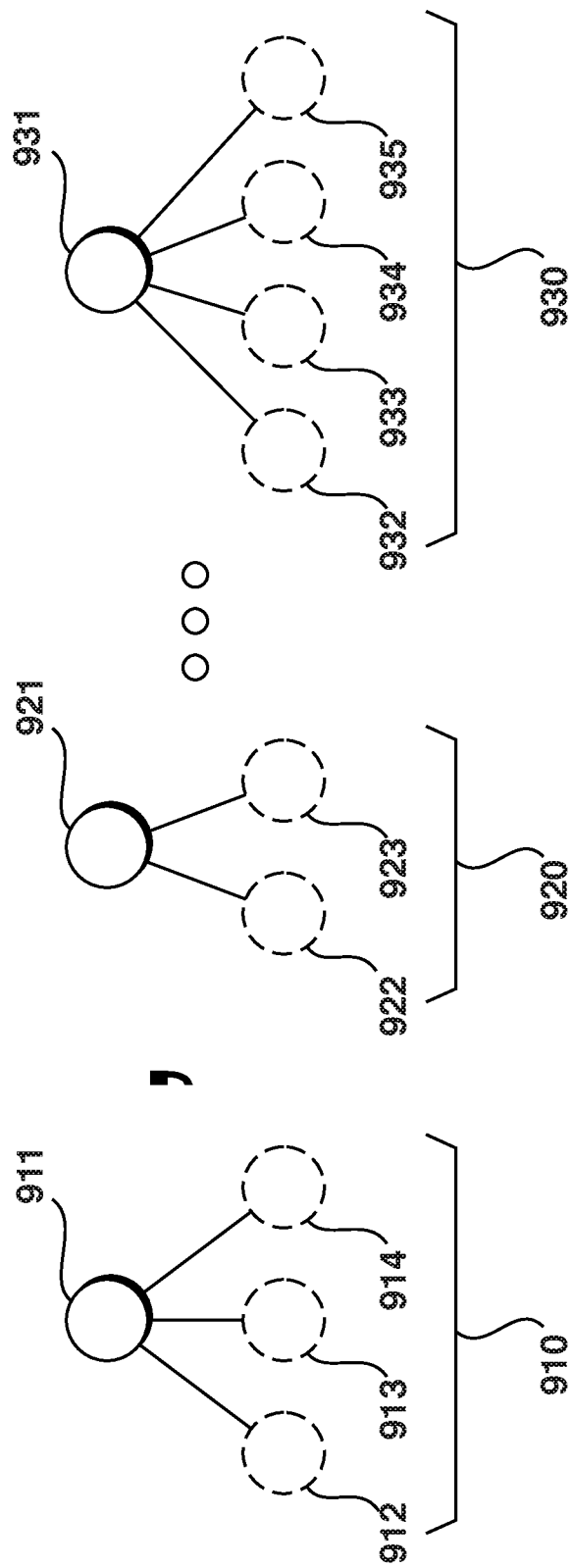
FIG. 9 is a diagram illustrating portions of preliminary tree models in accordance with another embodiment of the present technology.

The set of proto-trees of FIG. 9 is then used to select the "best" first feature to add to the trained decision tree prediction model under generation. For each one of the proto-trees, a prediction quality parameter is calculated for at least some of the leaves branching from the one or more nodes.

For example, the prediction quality parameter is determined for the proto-trees 910, 920 and 930. In some embodiments, leaf accuracy features are calculated for at least some of the leaves, for example for the leaves 912, 913, and 914 of the proto-tree 910. In some embodiments, the leaf accuracy features may be combined to determine the accuracy parameter. More details as to how the prediction quality parameter are determined will be detailed below.

The first feature to be used for the tree model being created may then be chosen by selecting a "best quality" proto-tree based on the prediction quality parameter for each one of the proto-trees. A feature associated with the "best quality" proto-tree is then chosen as the first feature for the trained decision tree prediction model under generation.

For demonstrative purposes, let us choose the proto-tree 920 as being the "best" proto-tree, for example based on a determination that the proto-tree 920 is associated with a highest accuracy parameter. Turning now to FIG. 10, a second set of proto-trees have been created in order to choose a best second level feature to add to the trained decision tree prediction model under generation. The node 921 and its corresponding branches are kept from the proto-tree 920. The rest of the proto-tree 920 and the first set of proto-trees may now be discarded.

The same set of training objects is then used to test a second set of proto-trees comprising the node 921 associated with the "best" first feature (fixed by the above process) and two nodes associated with a second feature, the second feature being a different one of the set of features for each one of the proto-trees.

In this example, there are two second level nodes because there were two branches associated with the node 921. If the "best" proto-tree had been the proto-tree 830 instead, there would be four nodes associated with the four branches emanating from the node 831.

Figure 10:
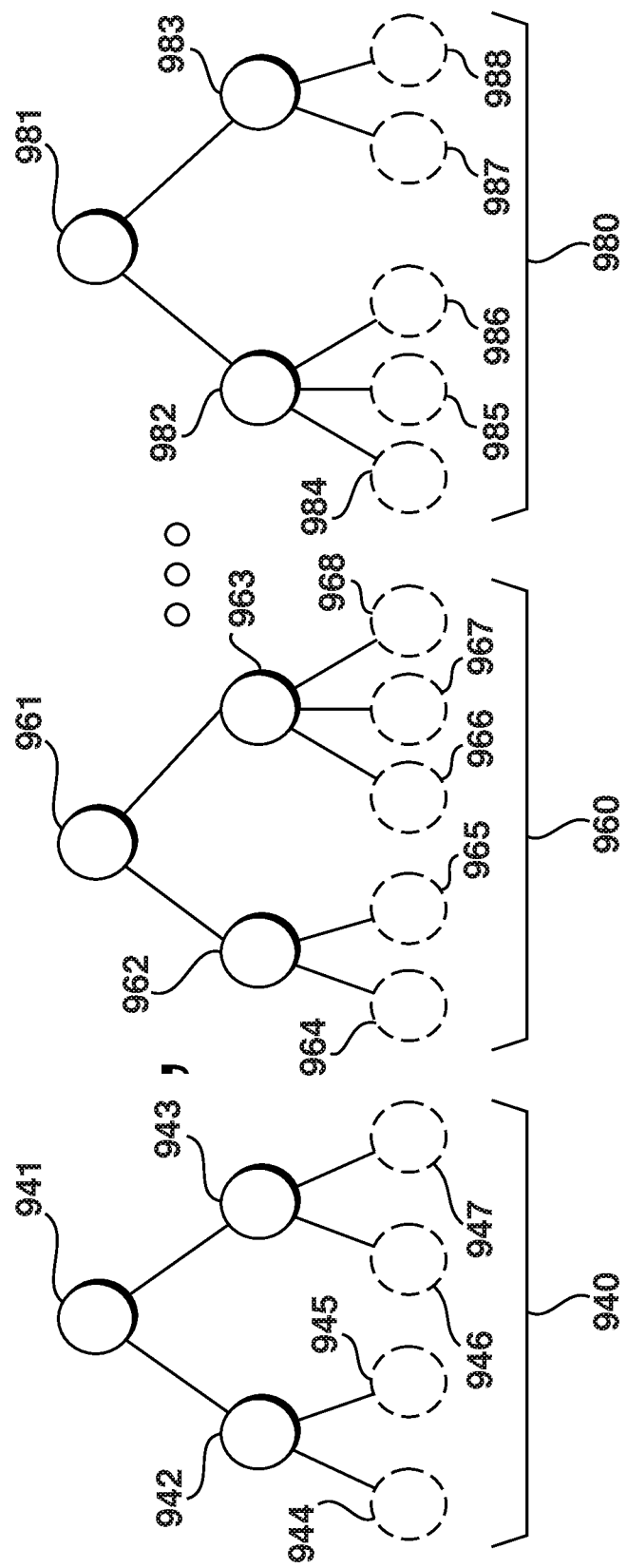
FIG. 10 is a diagram illustrating complete preliminary tree models in accordance with another embodiment of the present technology.

As illustrated in the three representative examples of proto-trees 940, 960 and 980 from the second set of proto-trees shown in FIG. 10, the first node of each proto-tree is the node 921 from the best first proto-tree and there are, added to the two branches emanating from the node 921, two nodes 942, 943 for the proto-tree 940; two nodes 962, 963 for the proto-tree 960 and two nodes 982, 983 for the proto-tree 980. Each one of the ends of the proto-trees 940, 960 and 980 are associated with leaves, leaves 944-647; 964-968 and 984-988, respectively.

A "best" second feature is now chosen in a same way as described above for the "best" first feature, where the proto-tree composed of the first feature and second feature have, a "better quality" (i.e., having a higher prediction quality parameter) than other proto-trees that were not selected. Then, the second feature associated with the second nodes of the proto-tree having the highest prediction quality parameter is chosen as the second feature to be fixed in the trained decision tree prediction model under generation. For example, if the proto-tree 960 is determined to be the proto-tree with a highest prediction quality parameter, the node 962 and the node 963 will be added to the trained decision tree prediction model under generation.

Similarly, if subsequent features and levels are to be added, a new set of proto-trees will be created using the node 921, the node 962 and the node 963, with new nodes added to the five branches emanating from the node 962 and the node 963. The method would be carried on for as many levels and associated features are desired in the trained decision tree prediction model under generation. It is contemplated that the trained decision tree prediction model may have more or fewer than three levels constructed in the above described way.

Once the trained decision tree prediction model is completed, the determination of the prediction quality parameter may also be carried out for the finished prediction model. In some embodiments, a set of trained decision tree prediction models may be relied upon to define a prediction model instead of a single trained decision tree prediction model, each trained decision tree prediction model of the set may have been generated in accordance with the method set forth above. In some embodiments, the features may be selected from a same set of features and a same set of training objects may be used.

Overall Concept of Processing Categorical Features into Numeric Representations Thereof In accordance with the non-limiting embodiments of the present technology, the master server 510 and/or the slave servers 520, 522, 524 are configured to process categorical features. More specifically, in accordance with the non-limiting embodiments of the present technology, the master server 510 and/or the slave servers 520, 522, 524 are configured to process categorical features into numeric representations thereof. More specifically, in accordance with the non-limiting embodiments of the present technology, the master server 510 and/or the slave servers 520, 522, 524 are configured to process categorical features into numeric representations thereof using the "dynamic boosting paradigm". In some non-limiting embodiments of the present technology, the master server 510 and/or the slave servers 520, 522, 524 are configured to process a group of categorical features into numeric representations thereof, the group of categorical features including at least a first categorical feature and a second categorical feature.

For the purposes of illustration, let's assume that the master server 510 and/or the slave servers 520, 522, 524 need to process is "music genre" and the prediction target of the function for the MLA to predict is "listened" or "not listened", based on the music genre. The feature "music genre" is categorical or, in other words, it can take one of many (but finite) values—such as: jazz, classical, reggae, folk, hip hop, pop, punk, opera, country, heavy metal, rock, etc.

In order for the master server 510 and/or the slave servers 520, 522, 524 to process the categorical feature, the categorical feature needs to be translated into a numeric value. More specifically, the value of a given categorical feature (i.e. one of jazz, classical, reggae, folk, hip hop, pop, punk, opera, country, heavy metal, rock) needs to be translated to a numeric representation thereof.

In accordance with the non-limiting embodiments of the present technology, the master server 510 and/or the slave servers 520, 522, 524 first create an ordered list of all training objects having categorical features to be processed during training of the MLA.

In case the training objects having categorical features have an inherent temporal relationship (for example, months of the year, years, etc.), the master server 510 and/or the slave servers 520, 522, 524 organize the training objects having categorical features in accordance with this temporal relationship. In case the training objects having categorical features do not have the inherent temporal relationship, the master server 510 and/or the slave servers 520, 522, 524 organize an ordered list of training objects having categorical features based on a rule.

For example, the master server 510 and/or the slave servers 520, 522, 524 can create a random order of training objects having categorical features. The random order becomes a proxy for temporal order of the training objects having categorical features that are not otherwise associated with inherent temporal relationship.

Using the above example of the categorical features being music genres—such training objects having categorical features may or may not be associated with the inherent temporal relationship. For example, in those scenarios, where the training objects having categorical features are associated with audio tracks played on or download from an online music repository service, the training objects having categorical features may be associated with the inherent temporal relationship based on the time of paying/downloading.

Irrespective of how the order is generated, the master server 510 and/or the slave servers 520, 522, 524 then "freezes" the training objects having categorical features in the so-organized order. The so-organized order, in a sense, can be said to specify for each one training object having categorical feature, which other training object(s) having categorical features occur "before" and which occurs "after" (even if the training objects having categorical features are not associated with the inherent temporal relationship).

With reference to FIG. 1, there is depicted a non-limiting example of an ordered list of training objects 102, the training objects being associated with categorical features (continuing with the example of the categorical features being genre of music, such as jazz, classical, reggae, folk, hip hop, pop, punk, opera, country, heavy metal, rock, etc.).

The ordered list of training objects 102 has a plurality of training objects 104. As an illustration only, the plurality of training objects 104 includes a first training object 106, a second training object 108, a third training object 110, a fourth training object 112, a fifth training object 114, a sixth training object 116, a seventh training object 118 and an eighth training object 120. Naturally, the plurality of training objects 104 may have fewer or more training objects contained therein. Each of the training objects of the plurality of training objects 104 has a categorical feature 122 associated therewith, as well as an event value 124. Using an example of the first training object 106, the categorical feature 122 associated therewith is "Pop", while the event value 124 is "0" (indicative for example, of a lack of a click during an interaction with the first training object 106 by a past user or an assessor).

To continue the description of the example illustrated in FIG. 1:

for the second training object 108, the categorical feature 122 associated therewith is "Rock", while the event value 124 is "1" (indicative for example, of a feature value presence of a click);

for the third training object 110, the categorical feature 122 associated therewith is "Disco", while the event value 124 is "1" (indicative for example, of a presence of a click);

for the fourth training object 112, the categorical feature 122 associated therewith is "Pop", while the event value 124 is "0" (indicative for example, of a lack of a click);

for the fifth training object 114, the categorical feature 122 associated therewith is "Pop", while the event value 124 is "1" (indicative for example, of a presence of a click);

for the sixth training object 116, the categorical feature 122 associated therewith is "Jazz", while the event value 124 is "0" (indicative for example, of a lack of a click);

for the seventh training object 118, the categorical feature 122 associated therewith is "Classical", while the event value 124 is "1" (indicative for example, of a presence of a click);

for the eighth training object 120, the categorical feature 122 associated therewith is "Reggae", while the event value 124 is "1" (indicative for example, of a presence of a click).

An order of the ordered list of training objects 102 is depicted in FIG. 1 at 126. In accordance with the non-limiting embodiments of the present technology, in line with the order 126 of the ordered list of training objects 102, a given training object in the ordered list of training objects 102 can be said to occur before or after another one of the ordered list of training objects 102. For example, the first training object 106 can be said to occur before any other training object of the plurality of training objects 104. As another example, the fourth training object 112 can be said to occur (i) after the first training object 106, the second training object 108, the third training object 110 and (ii) before the fifth training object 114, the sixth training object 116, the seventh training object 118 and the eighth training object 120. As a final example, the eighth training object 120 occurs after all other training objects of the plurality of training objects 104.

In accordance with the non-limiting embodiments of the present technology, when the master server 510 and/or the slave servers 520, 522, 524 need to translate a given categorical feature into its numeric representation, the master server 510 and/or the slave servers 520, 522, 524 calculate the number of appearance of the given categorical feature relative to other categorical features associated with training objects that occur before the given categorical feature in ordered list of training objects 102.

In other words and broadly speaking, the master server 510 and/or the slave servers 520, 522, 524 generate an indication of a "count" of the given categorical feature as will be explained in greater detail herein below. To give a temporal analogy, the master server 510 and/or the slave servers 520, 522, 524 uses only those categorical features which have happened in the "past" relative to the given categorical feature. Thus, when translating the categorical feature into the numeric representation thereof, the master server 510 and/or the slave servers 520, 522, 524 do not "peek" into the future of the given categorical feature (i.e. targets of those categorical features that happened "in the future" relative to the given categorical feature).

In a specific implementation of the non-limiting embodiments of the present technology, the master server 510 and/or the slave servers 520, 522, 524 calculate a function based on WINs and LOSSes associated with the categorical feature and its "past".

As an illustration, let's consider the fifth training object 114 (having the categorical feature 122 value of "Pop" and the associated event value 124 of "1"). The master server 510 and/or the slave servers 520, 522, 524 translates the value of the categorical feature 122 (i.e. "Pop") into a numeric feature using a formula:

$$\text{Count} = \frac{\text{Number\_WINs}}{\text{Number\_OCCURENCEs}} \quad \text{Formula 1}$$

Where Count is the numeric representation of a value of the categorical feature for a given object, Number$_{WINs}$ is the number of events for the given value of the categorical feature that are considered WINs and Number$_{OCCURENCEs}$ is the number of occurrences of the same value of the categorical feature that is being processed, both the number of events that are considered WINs and the number of occurrences of value of the categorical feature being prior to the place in the order 126 of the given categorical feature being processed.

As an example, the number of events that are considered WINs can be a successful occurrence of an the event associated with the given object associated with the given value of the categorical feature (i.e. the song having a particular genre associated with the given object was played or downloaded or liked), i.e. the event value 124 being "1" and not "0". The number of occurrences is the total number of occurrences of the value of the given categorical feature in the ordered list of training objects 102 that "appear" before the current occurrence (i.e. before the categorical feature that the MLA processes the count for). In other words, the system calculates the count for the given feature by only looking "backwards" along the ordered list of training objects 102. As an example, for a given feature value (rock) of a given object the number of events that are considered WINs can be the number of occurrences of objects with particular event type (e.g. the song associated with the training object was played or downloaded or liked, i.e. the event value 124 being "1" and not "0") and the number of the occurrences can be the total number of occurrences of the same feature value (rock) as in the given object.

In some non-limiting embodiments of the present technology, Formula 1 can be modified with a constant.

$$\text{Count} = \frac{\text{Number}_{WINs}}{\text{Number}_{OCCURENCEs} + R_{constant}} \quad \text{Formula 2}$$

Where the R_constant can be a pre-determined value.

Broadly speaking, non-limiting embodiments of the present technology can utilize any formula, as long as occurrences of the WINs and the total number of occurrences are used from the "past" of the current categorical feature being processed.

As such, broadly speaking, the formula can be represented as:

$$f(\text{Number\_WINs\_PAST}, \text{Number\_Occurence\_PAST}) \quad \text{Formula 3}$$

In alternative non-limiting embodiments of the present technology, any one of the Formulas 1, 2 or 3 can be modified to analyze a group of features rather than a single feature.

For example, rather than just looking at the genre of the song, the formula can analyze co-occurrence of the given genre and the given singer. When analyzing groups of categorical features, the master server 510 and/or the slave servers 520, 522, 524 apply the same "dynamic boosting" paradigm. As is the case with processing a single categorical feature, when the master server 510 and/or the slave servers 520, 522, 524 process a group of features, the master server 510 and/or the slave servers 520, 522, 524 only analyze co-occurrence of the group of feature that occur before the current occurrence of the group of categorical features being analyzed.

The formula can be modified as follows:

$$\text{Count} = \frac{\text{Number}_{WINs}(F1 \text{ and } F2)}{\text{Number}_{OCCURENCEs}(F1 \text{ and } F2)} \quad \text{Formula 4}$$

Where both the Number$_{WINs}$(F1 and F2) and the Number$_{OCCURENCEs}$(F1 and F2) are considering the wins and co-occurrences of the group of features (F1 and F2) values that occur before the current occurrence of the group of features in the ordered list of training objects 102.

As the number of features grows (for example, for the training objects being a song, the categorical features may include: genre, singer, album, etc.), so does the number of possible combinations within groups of features to be processed by the master server 510 and/or the slave servers 520, 522, 524 for the purposes of training and then, eventually, applying the trained MLA formula.

Rather than pre-calculating all the possible combinations of the categorical features, non-limiting embodiments of the present technology contemplate generating combination counters of features "inside" the MLA algorithm, as the master server 510 and/or the slave servers 520, 522, 524 go through the categorical features (i.e. "on the fly" when the master server 510 and/or the slave servers 520, 522, 524 build the decision tree (at a given iteration thereof) rather than pre-calculating all possible counters for all possible combinations of categorical features). The main technical advantage of this approach is that the master server 510 and/or the slave servers 520, 522, 524 need to calculate only those combination that actually occur, rather than every possible combination of categorical features.

For example, rather than calculating counters (i.e. numeric representation) for every possible combination of genre and singer, the master server 510 and/or the slave servers 520, 522, 524 can calculate counters (i.e. numeric representation) for only those categorical feature value combinations that the master server 510 and/or the slave servers 520, 522, 524 encounter in the ordered list of training objects 102, saving significantly on processing resources and memory required to store the information about each possible combination of categorical features values.

Broadly speaking, when the master server 510 and/or the slave servers 520, 522, 524 build a particular iteration of the decision tree model (for example, a particular decision tree in an ensemble of decision trees that are trained during execution of the gradient boosting approach). For each node of the decision tree, the master server 510 and/or the slave servers 520, 522, 524 translate the categorical features values (or groups of categorical features values, as the case may be) into numeric representation thereof as has been described above.

Once, for the given node or the given level, a best one of the so-translated categorical features has been selected (as well as any other numeric features that may be processed by the given node)—it is "frozen" for that node/that level of the decision tree at the given iteration of the decision tree boosting. In some embodiments of the present technology, when the master server 510 and/or the slave servers 520, 522, 524 descend to lower level nodes, the master server 510 and/or the slave servers 520, 522, 524 only calculate counters for those combinations of categorical features that the master server 510 and/or the slave servers 520, 522, 524 have encountered for the current variation of the decision tree (i.e. taking into account the categorical features that have been selected as best and "frozen" at higher levels of the decision trees). In alternative embodiments of the present technology, when the master server 510 and/or the slave servers 520, 522, 524 descend to lower level nodes, the master server 510 and/or the slave servers 520, 522, 524 only calculate counters for those combinations of categorical features values that the master server 510 and/or the slave servers 520, 522, 524 have encountered for the current variation of the decision tree (i.e. taking into account the categorical features that have been selected as best and "frozen" at higher levels of the decision trees), as well as previous variations of the decision trees built during previous iteration of the boosting of the decision trees as part of building the ensemble of decision trees.

Taking an example of the current level in the decision tree being a third level (i.e. the third level that is preceded by a root node, a first level and a second level of the decision tree), when the master server 510 and/or the slave servers 520, 522, 524 calculate the categorical features' numeric representation for the third level, the MLA calculates all possible combinations of the categorical features for the third level in combination with the "frozen" categorical features that have been selected as best and "frozen" for the root node, the first level and second level nodes.

In other words, it can be said that for a given node of a given level of the decision tree, the master server 510 and/or the slave servers 520, 522, 524 calculate the "counters" of the possible categorical features for the given node of the given level of the decision tree by adding all possible categorical features to the already selected best categorical features that have been "frozen" at previous levels relative to the given level of the decision tree.

Now, turning our attention how the splits are selected in associated with the given categorical feature (or, more specifically, its counter) at the given level of the decision tree. The splits are also calculates "inside" the MLA algorithm, i.e. "on the fly" when the master server 510 and/or the slave servers 520, 522, 524 build the decision tree (at a given iteration thereof) rather than pre-calculating all possible splits for all possible counters.

Figure 2:
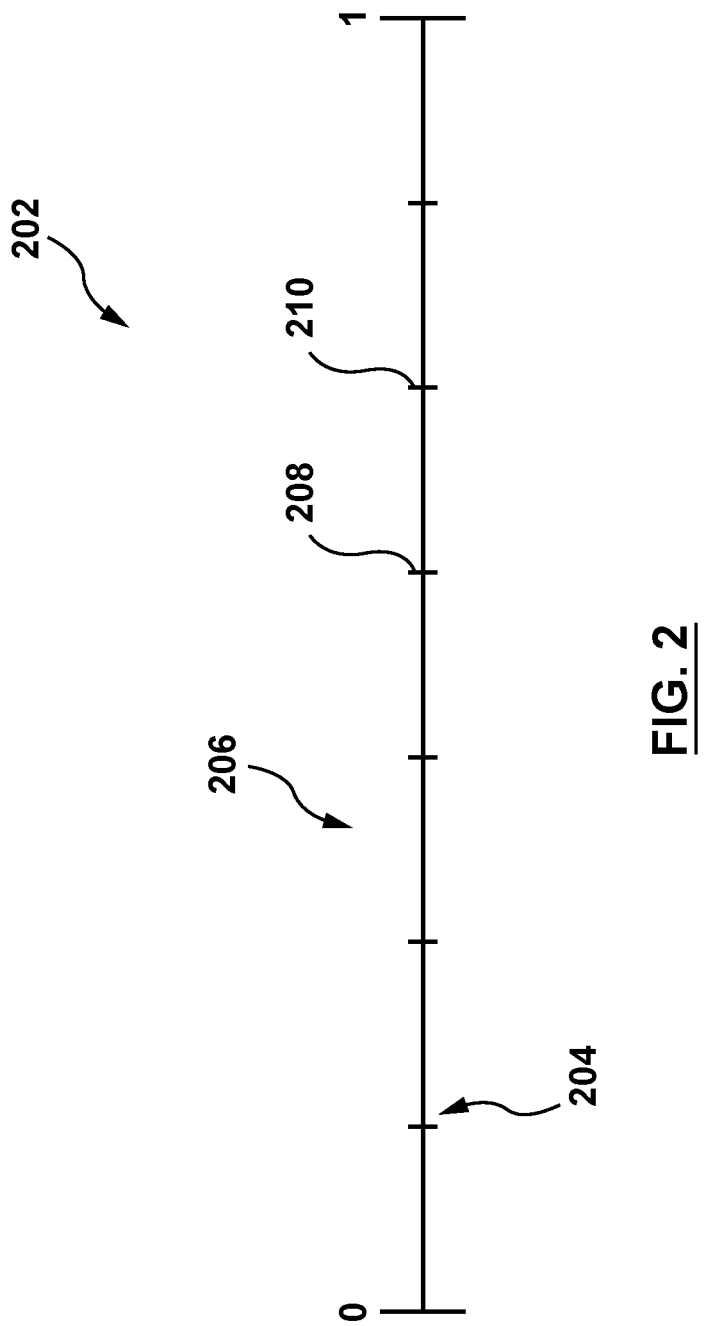
FIG. 2 depicts a range of all possible values for the splits (for a given counter having been generated based on the given categorical feature) and a pre-determined grid applied to the range, both the range and the applied grid being implemented in accordance with non-limiting embodiments of the present technology.

With reference to FIG. 2, in a specific embodiment of the present technology, the master server 510 and/or the slave servers 520, 522, 524 generate the splits by generating a range 202 of all possible values for the splits (for a given counter having been generated based on the given categorical feature) and applying a pre-determined grid 204. In some embodiments of the present technology, the range 202 can be between 0 and 1. In other embodiments of the present technology, which is especially pertinent when a coefficient ($R_{constant}$) is applied to calculating the values of the counts, the range 202 can be between: (i) the value of the coefficient and (ii) the value of coefficient plus one.

In some embodiments of the present technology, the pre-determined grid 204 is a regular interval grid, which parses the range 202 into regular intervals 206. In other embodiments of the present technology, the pre-determined grid 204 is an irregular interval grid, which parses the range into irregular intervals.

As a result of not pre-processing all possible categorical feature combinations and processing counters "inside" the MLA algorithm, it is also impossible to process splits for the nodes "inside" the MLA building the decision tree model. In accordance with the non-limiting embodiments of the present technology, the master server 510 and/or the slave servers 520, 522, 524 define splits for the tree nodes without knowing all possible values for the counters based on the above-described approach using grids. The master server 510 and/or the slave servers 520, 522, 524 generate the range 202 of splits and organize it into "buckets" 206 and the edges of the buckets 206 (such as edges 208 and 210) become values for the splits. In use, the master server 510 and/or the slave servers 520, 522, 524 need to determine which bucket 206 a given counter "falls"—which becomes the value of the split.

In some embodiments of the present technology, the master server 510 and/or the slave servers 520, 522, 524 calculate the splits for each level of the decision tree and, once the given level of the decision tree is optimized (i.e. once the master server 510 and/or the slave servers 520, 522, 524 have selected the "best" feature and split for the given level of the decision tree), the MLA may erase the calculated splits. When the master server 510 and/or the slave servers 520, 522, 524 get to the next level, the master server 510 and/or the slave servers 520, 522, 524 re-calculate the splits anew. In other embodiments of the present technology, the splits are calculated and "forgotten" on per-decision-tree basis and not on a per-level basis.

When the master server 510 and/or the slave servers 520, 522, 524 build a decision tree at a particular iteration of the decision tree model building, for each level, the master server 510 and/or the slave servers 520, 522, 524 test and optimize the best of: which feature to place at the node of the level and which split value (out of all possible pre-defined values) to place at the node.

Figure 3:
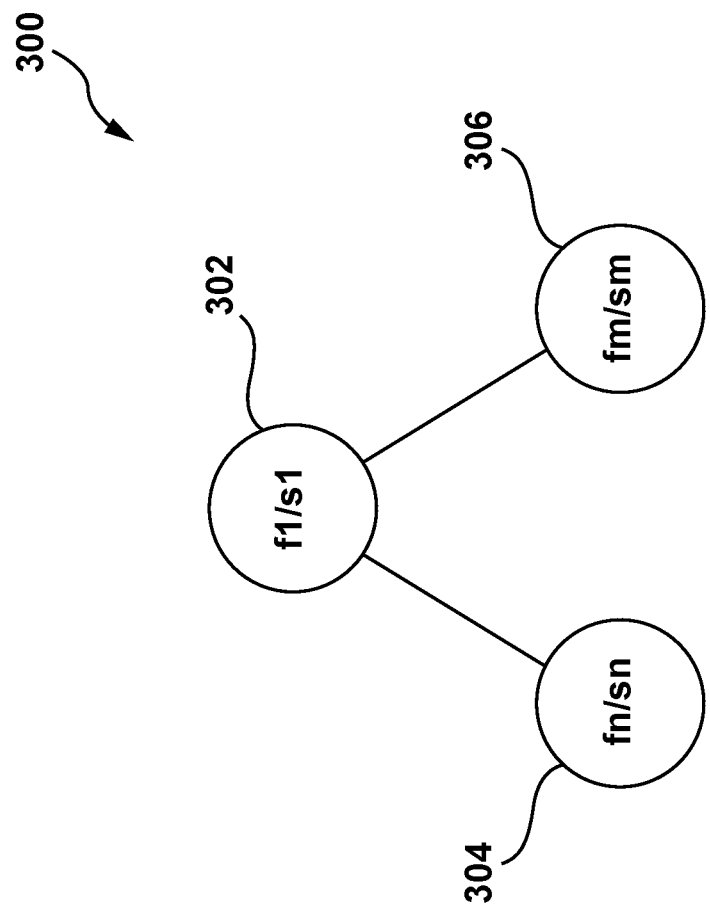
FIG. 3 is a diagram illustrating a portion of a proto-tree with a single first level node and two instances of a second level node generated in accordance with another embodiments of the present technology.

To illustrate the above and with reference to FIG. 3, there is depicted a portion of a proto-tree 300—with a single first level node (a first node 302), which can also be considered as a "root node" and two instances of a second level node (a second node 304 and a third node 306). For the purposes of the illustration to be presented herein below, it shall be assumed that the value of the feature and the split for the first node 302 have been selected (f1/s1). When the master server 510 and/or the slave servers 520, 522, 524 build a decision tree at a particular iteration of the decision tree model building, the level of the second node 304 and the third node 306, the master server 510 and/or the slave servers 520, 522, 524 test and optimize the best of: which feature to place at the node of the level and which split value (out of all possible pre-defined values) to place at the node. More specifically, the master server 510 and/or the slave servers 520, 522, 524 have selected fn/sn as the feature and the split for the second node 304 and fm/sm, as the feature and the split for the third node 306.

Figure 11:
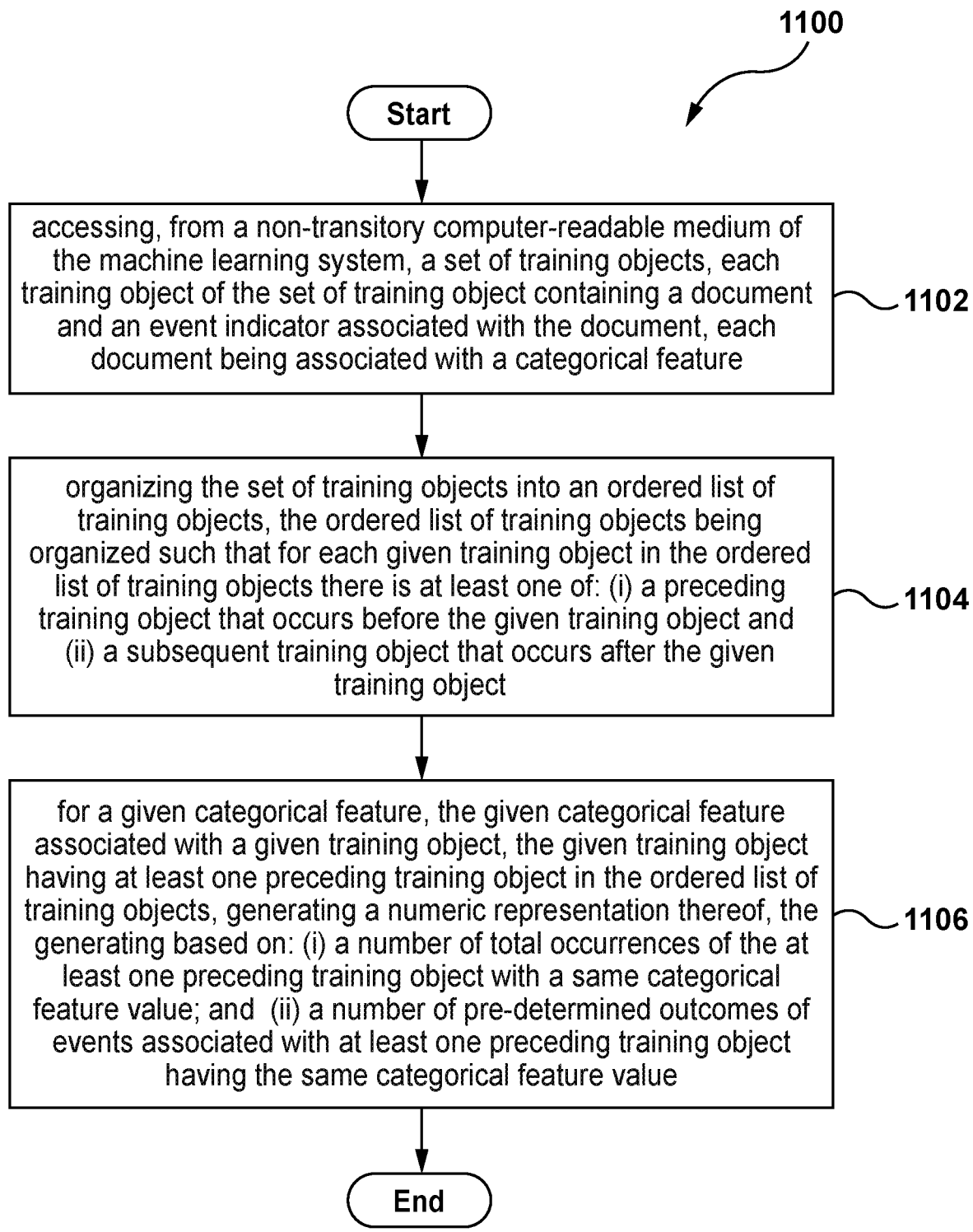
FIG. 11 is a diagram illustrating a portion of a proto-tree with a single first level node and two instances of a second level node, as well as an ordered list of training objects generated in accordance with another embodiments of the present technology.

Given the architecture described above, it is possible to implement a method of converting a categorical feature value into a numeric representation thereof, the categorical feature being associated with a training object used for training a Machine Learning Algorithm (MLA). With reference to FIG. 11, there is depicted a block diagram of a method 1100, the method 1100 being executed in accordance with the non-limiting embodiments of the present technology. The method 1100 can be executed by the master server 510 and/or the slave servers 520, 522, 524.

Step 1102—Accessing, from a Non-Transitory Computer-Readable Medium of the Machine Learning System, a Set of Training Objects, Each Training Object of the Set of Training Object Containing a Document and an Event Indicator Associated with the Document, Each Document being Associated with a Categorical Feature At step 1102, the master server 510 and/or the slave servers 520, 522, 524 access, a set of training objects, each training object of the set of training object containing a document and an event indicator associated with the document, each document being associated with a categorical feature and an associated categorical feature value.

Step 1104—Organizing the Set of Training Objects into an Ordered List of Training Objects, the Ordered List of Training Objects being Organized Such that for Each Given Training Object in the Ordered List of Training Objects there is at Least One of: (i) a Preceding Training Object that Occurs Before the Given Training Object and (ii) a Subsequent Training Object that Occurs after the Given Training Object At step 1104, the master server 510 and/or the slave servers 520, 522, 524 organize the set of training objects into an ordered list of training objects, the ordered list of training objects being organized such that for each given training object in the ordered list of training objects there is at least one of: (i) a preceding training object that occurs before the given training object and (ii) a subsequent training object that occurs after the given training object.

Step 1106—for a Given Categorical Feature, the Given Categorical Feature Associated with a Given Training Object, the Given Training Object Having at Least One Preceding Training Object in the Ordered List of Training Objects, Generating a Numeric Representation Thereof, the Generating Based on: (i) a Number of Total Occurrences of the at Least One Preceding Training Object with a Same Categorical Feature Value; and (ii) a Number of Pre-Determined Outcomes of Events Associated with at Least One Preceding Training Object Having the Same Categorical Feature Value At step 1106, the master server 510 and/or the slave servers 520, 522, 524, for a given categorical feature, the given categorical feature associated with a given training object, the given training object having at least one preceding training object in the ordered list of training objects, generating a numeric representation thereof, the generating based on: (i) a number of total occurrences of the at least one preceding training object with a same categorical feature value; and (ii) a number of pre-determined outcomes of events associated with at least one preceding training object having the same categorical feature value.

In some embodiments of the method 1100, the generating comprises applying a formula:

$$\text{Count} = \frac{Number_{WINs}}{Number_{OCCURENCEs}}$$

where:

$Number_{OCCURENCEs}$ is the number of total occurrences of the at least one preceding training object with a same categorical feature value; and $Number_{WINs}$ is the number of pre-determined outcomes of events associated with at least one preceding training object having the same categorical feature value.

In some implementations of the method 1100, the generating comprises applying a formula:

$$\text{Count} = \frac{Number_{WINs}}{Number_{OCCURENCEs} + R_{constant}}$$

where:

$Number_{OCCURENCEs}$ is the number of total occurrences of the at least one preceding training object with a same categorical feature value;

$Number_{WINs}$ is the number of pre-determined outcomes of events associated with at least one preceding training object having the same categorical feature value; and $R_{constant}$ is a pre-determined value.

In some implementations of the method 1100, the given categorical feature comprises a set of categorical features that includes at least a first categorical feature and a second categorical feature, and wherein generating the numeric representation thereof comprises: (i) using as the number of total occurrences of the at least one preceding training object with the same categorical feature value: a number of total occurrences of the at least one preceding training object having both the first categorical feature value and the second categorical feature value; and (ii) using as the number of the pre-determined outcomes of events associated with at least one preceding training object having the same categorical feature value: a number of the pre-determined outcomes of events associated with at least one preceding training object having both the first categorical feature value and the second categorical feature value.

In some implementations of the method 1100, the generating the numeric representation thereof comprises applying a formula:

$$\text{Count} = \frac{Number_{WINs}(F1 \text{ and } F2)}{Number_{OCCURENCEs}(F1 \text{ and } F2)}$$

where (i) the $Number_{WINs}(F1 \text{ and } F2)$ is the number of total occurrences of the at least one preceding training object with the same set of categorical features values; and (ii) $Number_{OCCURENCEs}(F1 \text{ and } F2)$ is the number of the pre-determined outcomes of events associated with at least one preceding training object having the same set of categorical features values.

In some implementations of the method 1100, the event indicator has a pre-determined value, the pre-determined value being one of a positive outcome and a negative outcome.

In some implementations of the method 1100, the organizing the set of training objects into the ordered list of training objects is executed at a point in time prior to the generating of the numeric value.

In some implementations of the method 1100, the organizing the set of training objects into the ordered list of training objects comprises organizing a plurality of sets of ordered lists and wherein the method further comprises, prior to the generating of the numeric value selecting a given one of the plurality of sets of ordered lists.

In some implementations of the method 1100, the training objects are associated with an inherent temporal order, and wherein the organizing the set of training objects into the ordered list of training objects comprises organizing the training objects in accordance with the temporal order.

In some implementations of the method 1100, the training objects are not associated with an inherent temporal order, and wherein the organizing the set of training objects into the ordered list of training objects comprises organizing the training objects in accordance with a pre-determined rule.

In some implementations of the method 1100, the training objects are not associated with an inherent temporal order, and wherein the organizing the set of training objects into the ordered list of training objects comprises generating a random order of the training objects to be used as the ordered list.

Given the architecture described above, it is possible to implement a method of converting a categorical feature value into numeric representation thereof, the categorical feature being associated with a training object used for training a Machine Learning Algorithm (MLA), the MLA using a decision tree model having a decision tree, the training object being processed in a node of a given level of the decision tree, the decision tree having at least one prior level of the decision tree, the at least one prior level having at least one prior training object having at least one categorical feature having been converted to a prior numeric representation thereof for the at least one prior level of the decision tree.

Figure 12:
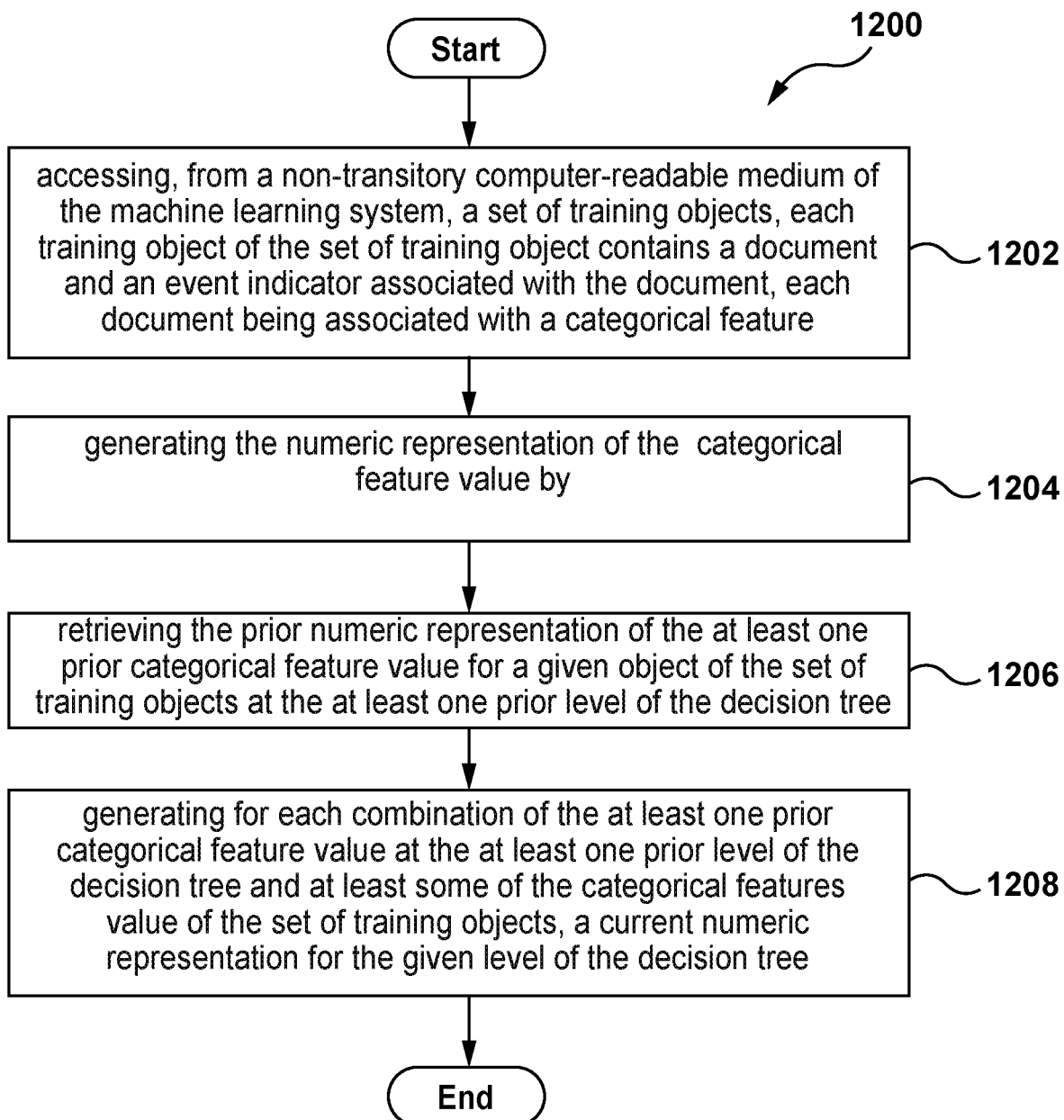
FIG. 12 is a diagram illustrating a flowchart illustrating a first computer-implemented method implementing embodiments of the present technology.

With reference to FIG. 12, there is depicted a block diagram of a method 1200, the method 1200 being executed in accordance with the non-limiting embodiments of the present technology. The method 1200 can be executed by the master server 510 and/or the slave servers 520, 522, 524.

Step 1202—Accessing, from a Non-Transitory Computer-Readable Medium of the Machine Learning System, a Set of Training Objects, Each Training Object of the Set of Training Object Containing a Document and an Event Indicator Associated with the Document, Each Document being Associated with a Categorical Feature At step 1202, the master server 510 and/or the slave servers 520, 522, 524 access a set of training objects, each training object of the set of training object containing a document and an event indicator associated with the document, each document being associated with a categorical feature and a categorical feature value.

Step 1204—Generating the Numeric Representation of the Categorical Feature Value (the Generating being Done in-Line with Generating the Decision Tree), the Generating being Executed by Executing Steps 1206 and 1208

At step 1204, the master server 510 and/or the slave servers 520, 522, 524 generate the numeric representation of the categorical feature value (the generating being done in-line with generating the decision tree), the generating being executed by executing steps 1206 and 1208.

Step 1206—Retrieving the Prior Numeric Representation of the at Least One Prior Categorical Feature Value for a Given Object of the Set of Training Objects at the at Least One Prior Level of the Decision Tree At step 1206, the master server 510 and/or the slave servers 520, 522, 524 retrieve the prior numeric representation of the at least one prior categorical feature value for a given object of the set of training objects at the at least one prior level of the decision tree.

Step 1208—Generating, for Each Combination of the at Least One Prior Categorical Feature Value at the at Least One Prior Level of the Decision Tree and at Least Some of the Categorical Features Values of the Set of Training Objects, a Current Numeric Representation for the Given Level of the Decision Tree At step 1208, the master server 510 and/or the slave servers 520, 522, 524 generate, for each combination of the at least one prior categorical feature value at the at least one prior level of the decision tree and at least some of the categorical features values of the set of training objects, a current numeric representation for the given level of the decision tree.

In some of the non-limiting embodiments of the method 1200, the generating is executed for only those prior categorical feature values that have been generated at the at least one prior level of the decision tree. In other non-limiting embodiments of the method 1200, the generating is executed for only those prior categorical feature values that have been generated at the at least one prior level of the decision tree and at least one previous iteration of the decision tree.

In some of the non-limiting embodiments of the method 1200, the method 1200 further comprises organizing the set of training objects into the ordered list of training objects. The organizing the training objects into the ordered list of training objects is executed at a point in time prior to the generating of the numeric value.

In some of the non-limiting embodiments of the method 1200, the organizing the set of training objects into the ordered list of training objects can include organizing a plurality of sets of ordered lists and wherein the method 1200 further comprises, prior to the generating of the numeric value selecting a given one of the plurality of sets of ordered lists.

Given the architecture described above, it is possible to implement a method of generating a split value for a node in a decision tree of a decision tree model used by a Machine Learning Algorithm (MLA), the split value being for a node at a particular level of the decision tree, the node for classifying an object having a categorical feature that is to be translated into a numeric value representative thereof, the split is for causing the object to be classified in one of child nodes of the node based on the numeric value and the split value.

Figure 13:
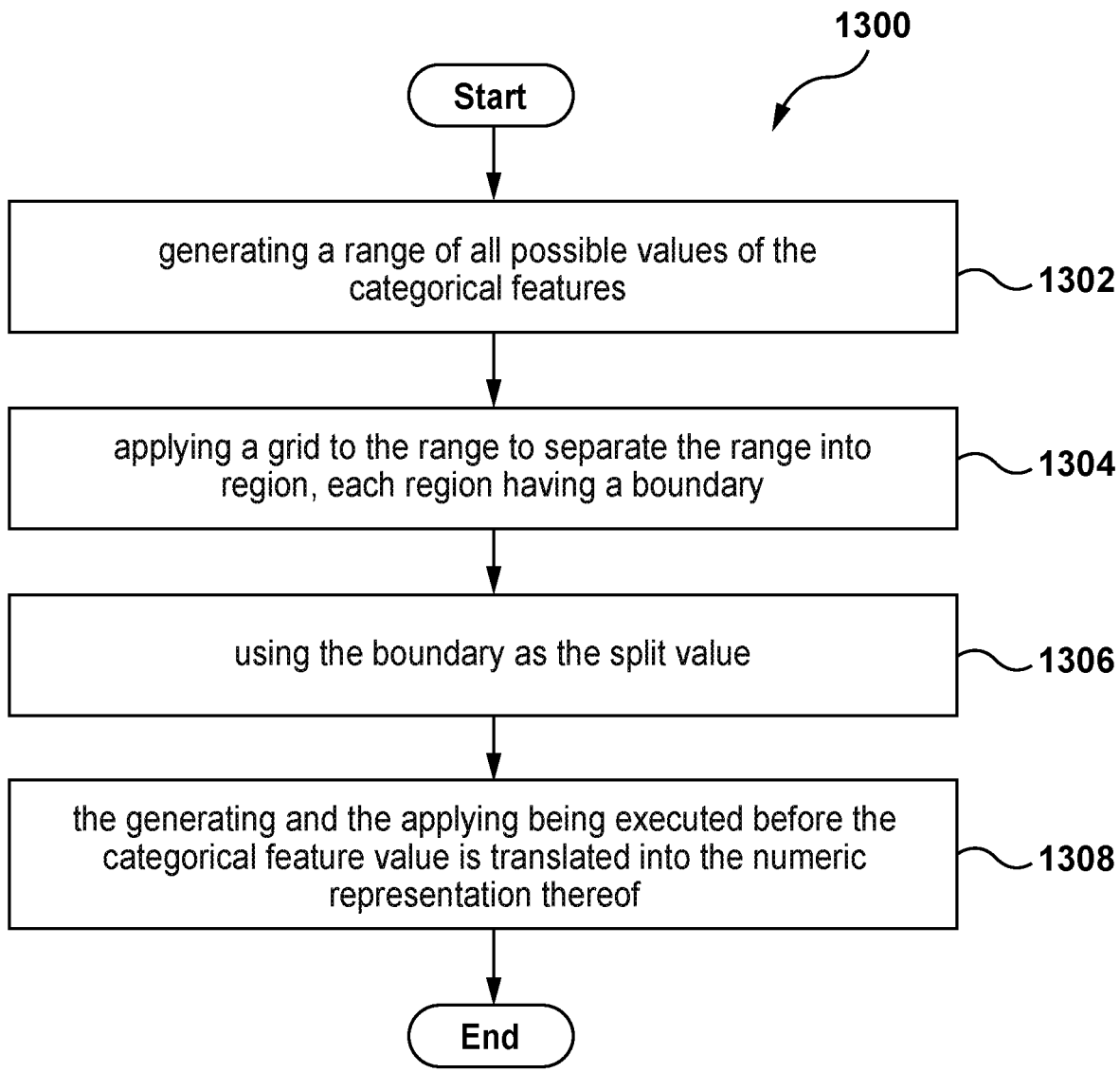
FIG. 13 is a diagram illustrating a flowchart illustrating a second computer-implemented method implementing embodiments of the present technology.

With reference to FIG. 13, there is depicted a block diagram of a method 1300, the method 1300 being executed in accordance with the non-limiting embodiments of the present technology. The method 1300 can be executed by the master server 510 and/or the slave servers 520, 522, 524.

Step 1302—Generating a Range of all Possible Values of the Categorical Features

At step 1302, the master server 510 and/or the slave servers 520, 522, 524 generate a range 202 of all possible values of the categorical features.

Step 1304—Applying a Grid to the Range to Separate the Range into Region, Each Region Having a Boundary At step 1304 the master server 510 and/or the slave servers 520, 522, 524 apply a grid 204 to the range to separate the range 202 into regions, each region having a boundary.

Step 1306—Using the Boundary as the Split Value

At step 1306, the master server 510 and/or the slave servers 520, 522, 524 use the boundary as the split value.

Step 1308—the Generating and the Applying being Executed Before the Categorical Feature is Translated into the Numeric Representation Thereof At step 1308, the master server 510 and/or the slave servers 520, 522, 524 execute the steps of generating and the applying being before the categorical feature is translated into the numeric representation thereof.

In some implementations, of the method 1300, the grid 204 has a pre-determined format.

In some implementations, of the method 1300, the grid 204 is a regular interval grid.

In some implementations, of the method 1300, the grid 204 is an irregular interval grid.

In some implementations, of the method 1300, the range 202 is between zero and one.

In some implementations, of the method 1300, the numeric values of the categorical feature are calculated using an $R_{constant}$ and wherein the range 202 is between $R_{constant}$ and $1+(R_{constant})$.

In some implementations, of the method 1300, the method 1300 further comprises, during an in-use phase, for a given counter value representing a categorical feature, determining which bucket defined by the grid the given counter value falls into and using the associated boundaries as values for splits.

In some implementations, of the method 1300, the using the boundary as the split value is executed for each level of the decision tree and wherein the method further comprises, once a given level of the decision tree is trained, re-calculating the split value.

In some implementations, of the method 1300, the using the boundary as the split value is executed for each decision tree and wherein the method further comprises, once a given decision tree is trained, re-calculating the split value.

In some implementations, of the method 1300, the using the boundary as the split value is executed during training of the MLA and wherein the training of the MLA, during a given iteration of one of: (i) a given level of the decision and (ii) a given iteration of the decision tree, comprises: selecting a best value of a feature to be placed at the given iteration and a best value of the split associated therewith.

In accordance with some non-limiting embodiments of the present technology, when the master server 510 and/or the slave servers 520, 522, 524 build the decision tree based model for the MLA, the master server 510 and/or the slave servers 520, 522, 524 generate a set of models, with each model being its own ensemble of decision trees.

Figure 14:
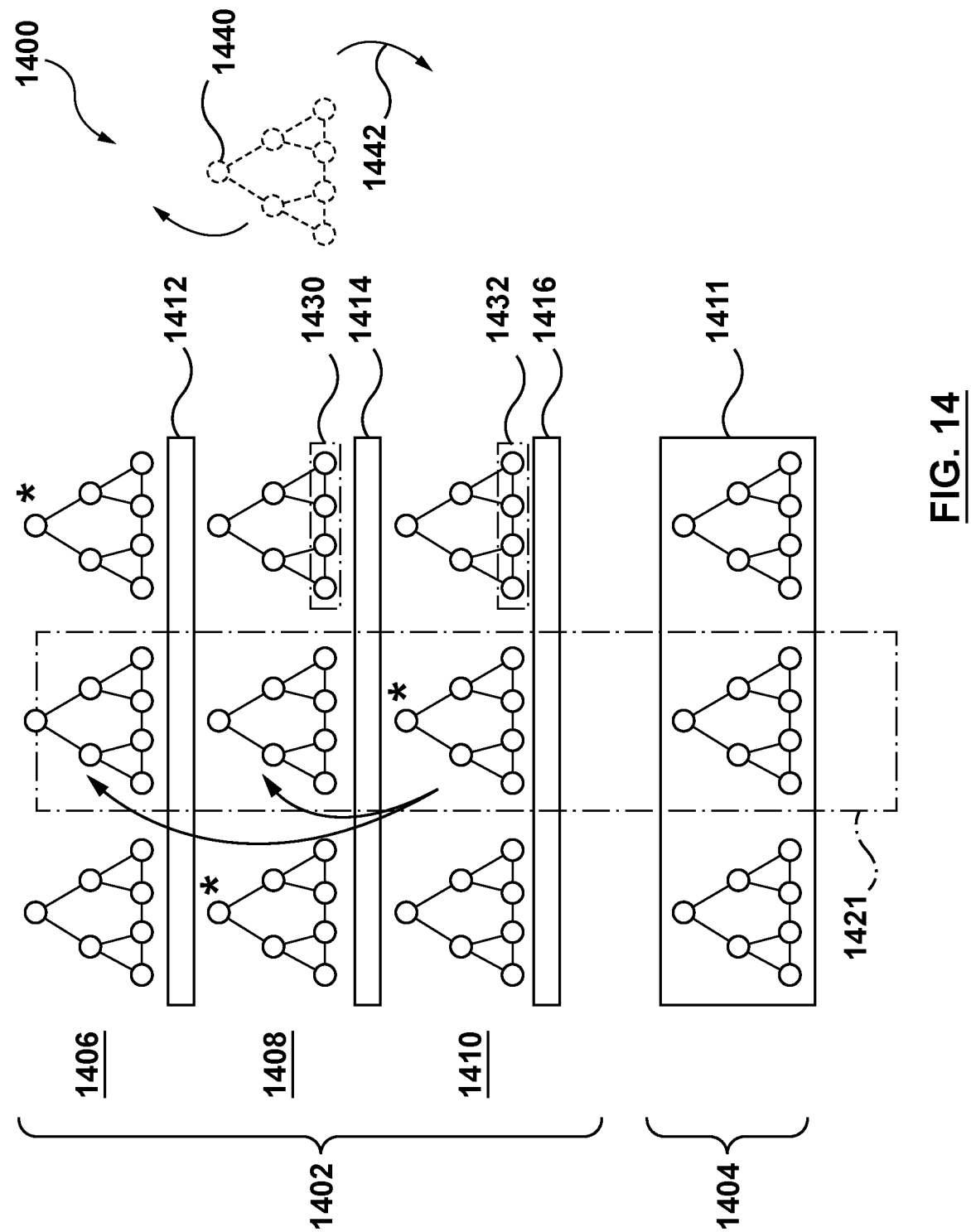
FIG. 14 is a schematic diagram of a set of models and associated respective ordered sets of training objects used for training a machine learning algorithm in accordance with some non-limiting embodiments of the present technology.

With reference to FIG. 14, there is schematically depicted a set of models 1400. In this particular illustration, the set of models 1400 comprises four models—three proto-models 1402 and a production model 1404. The three proto-models 1402 include a first proto-model 1406, a second proto-model 1408 and a third proto-model 1410. The first proto-model 1406, the second proto-model 1408 and the third proto-model 1410 are working models and are used for optimizing the production model 1404.

Each of the first proto-model 1406, the second proto-model 1408 and the third proto-model 1410 comprises its own ensemble of trees (each ensemble of trees having multiple iterations, or instances, of the decision trees), only one ensemble of tree being enumerated at 1411 in FIG. 14.

In addition, each one of the first proto-model 1406, the second proto-model 1408 and the third proto-model 1410 is associated with its own ordered list of the training objects. To that end, the first proto-model 1406 is associated with a first ordered list of objects 1412, the second proto-model 1408 is associated with a second ordered list of objects 1414 and the third proto-model 1410 is associated with a third ordered list of objects 1416. The first ordered list of objects 1412, the second ordered list of objects 1414 and the third ordered list of objects 1416 can be generated as was described in association with the ordered list of training objects 102.

As such, it can be said that each given iteration through the first proto-model 1406, the second proto-model 1408, the third proto-model 1410, and the production model 1404 are associated with the same structure of the tree model, but since a different permutation of the ordered list of training objects is used (and thus, some or all levels of a given decision tree will have different selected features and splits), the leafs of the given iteration through the first proto-model 1406, the second proto-model 1408, the third proto-model 1410, and the production model 1404 are associated with difference values (at least when it comes to the categorical features that are translated into numeric representations as has been described above). The given iteration of building on the decision trees is depicted schematically in FIG. 14 at 1421.

When the master server 510 and/or the slave servers 520, 522, 524 build a given iteration of a decision tree in a given ensemble of decision trees, the master server 510 and/or the slave servers 520, 522, 524 execute: selecting one of the set of models and the respective ordered list; generating a decision tree structure using the one of the set of models; when processing a given categorical feature using the decision tree structure, the given categorical feature associated with a given training object, the given training object having at least one preceding training object in the ordered list of training objects, generating a numeric representation thereof, the generating based on: (i) a number of total occurrences of the at least one preceding training object with a same categorical feature value in the respective ordered list; and (ii) a number of pre-determined outcomes of events associated with at least one preceding training object having the same categorical feature value in the respective ordered list.

In other words, at each iteration of building of decision trees (such as the given iteration 1421), the master server 510 and/or the slave servers 520, 522, 524 select a particular model of three proto-models 1402 and use it for building the tree structure that is then permutated to the other ones of the three proto-models 1402. The selection can be done randomly or using a pre-determined algorithm. For each iteration of the decision tree building depicted in FIG. 14, the model that was used for building the structure of the decision tree is marked with an asterisk (*). The permutations of the so-selected model are depicted with arrows only for the given iteration 1421. However, they work in substantially the same way for other iterations of building of the decision trees.

Since each one of the three proto-models 1402 models is associated with its own permutation of the ordered list of training objects, the values in the leafs will be different between the three proto-models 1402 at the given iteration of the decision tree model building (such as the given iteration 1421). Schematically this is depicted in FIG. 14, as values in leafs 1430 being at least partially different from values in leafs 1432. This approach of having several models (i.e. the three proto-models 1402), each model having its own permutation of the ordered list of training objects (i.e. the first ordered list of objects 1412, the second ordered list of objects 1414 and the third ordered list of objects 1416) allows to at least reduce or delay occurrence of overfitting during training.

When the master server 510 and/or the slave servers 520, 522, 524 build a given new iteration of a decision tree 1440 in a given ensemble of decision trees (in the illustrated embodiment, the second model, i.e. the second proto-model 1408, was picked as the basis for building the structure of the decision trees), the master server 510 and/or the slave servers 520, 522, 524 generate the structure of the decision tree using the selected model and then "project" the so-built structure on the remainder of the decision tree models (depicted in FIG. 14 with arrows 1442). Each of the proto-models 1402 is then filled with training objects (with the categorical features being translated using the associated ordered lists, i.e. the first ordered list of objects 1412, the second ordered list of objects 1414 and the third ordered list of objects 1416).

The master server 510 and/or the slave servers 520, 522, 524 then selects the "best model". The selecting of the best model can be executed using one of known validation techniques. It is noted that when the validation techniques are applied, they are using the values in the leafs at the given iteration of the given decision tree, as well as the previous decision trees in the same model. Given that each model has its own ordered list of training objects, at each iteration of the building of decision tree a different model is likely to produce the best results. The so-selected best model is then used for generating the decision tree at the current iteration of the production model 1404.

Specific embodiments of the embodiments of the present technology can be implemented using various mathematical principles encoded into proper computer-executable instructions to execute the various methods and routines described herein. An example of such principles is described in an article entitled "Fighting biases with dynamic boosting" by Dorogush et al., submitted to Cornell University Library on 28 Jun. 2017 and available from arXiv; the content of which article is hereby incorporated by reference in its entirety).

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of converting a value of a categorical feature into a numeric representation thereof, the categorical feature being associated with a training object used for training a Machine Learning Algorithm (MLA), the MLA being executable by a first server to predict a target value for an in-use object, the MLA comprising a set of models hosted by a plurality of second servers, each model of the set of models being based on an ensemble of decision trees, the training object being processed in a node of a given level of a decision tree of the ensemble of decision trees, the decision tree having at least one prior level of the decision tree, the at least one prior level having at least one prior training object having at least one prior categorical feature value having been converted to a prior numeric representation thereof for the at least one prior level of the decision tree, the MLA executable by an electronic device to predict a value for an in-use object, the method comprising:
accessing, from a non-transitory computer-readable medium of the first server, a set of training objects, wherein each training object of the set of training objects contains a document and an event indicator associated with the document, and wherein each document is associated with a categorical feature;
organizing the set of training objects into an ordered list of training objects, wherein when the training objects are associated with an inherent temporal order, the ordered list of training objects are ordered in accordance with the temporal order and when the training objects do not have an inherent temporal order, generating the ordered list of training objects in a random order of the training objects to be used as the ordered list of training objects;
storing the set of training objects in a plurality of databases, wherein each database of the plurality of databases comprises a copy of the set of training objects, and wherein each second server of the plurality of second servers is associated with a respective database of the plurality of databases;
generating, by the plurality of second servers operating in parallel, each second server accessing the set of training objects on its respective database of the plurality of databases, the set of models for the MLA, wherein generating each model of the set of models comprises generating the numeric representation of the categorical feature value by:
retrieving the prior numeric representation of the at least one prior categorical feature value for a given object of the set of training objects at the at least one prior level of the decision tree;
generating, for each combination of the at least one prior categorical feature value at the at least one prior level of the decision tree and at least one of the categorical feature values of the set of training objects, a current numeric representation for the given level of the decision tree, the generating the current numeric representation being done while generating the decision tree, wherein the current numeric representation is generated by:
(i) counting a first number of training objects that precede the training object in the ordered list and have both the at least one of the categorical feature values and event indicators with positive outcomes,
(ii) counting a second number of total training objects that precede the training object in the ordered list with the at least on of the categorical feature values, and
(iii) dividing the first number by the second number; and
after building the set of models for the MLA, transmitting, by the plurality of second servers and to the first server, indications that the set of models for the MLA has been generated.

2. The method of claim 1, wherein,
for each given training object in the ordered list of training objects there is at least one of:
(i) a preceding training object that occurs before the given training object and
(ii) a subsequent training object that occurs after the given training object, and wherein
the at least one of the categorical feature values are those categorical features values associated with training objects that appear earlier in the ordered list of training objects.

3. The method of claim 1, wherein the generating the current numeric representation is executed for those prior categorical feature values that have been generated at the at least one prior level of the decision tree.

4. The method of claim 1, wherein the generating the current numeric representation is executed for those prior categorical feature values that have been generated at the at least one prior level of the decision tree and at least one previous iteration of the decision tree.

5. The method of claim 1, wherein the event indicator indicates either a positive outcome or a negative outcome.

6. The method of claim 2, wherein the set of training objects are organized into the ordered list of training objects at a point in time prior to the generating of the numeric representation.

7. The method of claim 2, further comprising organizing a plurality of sets of ordered lists of training objects and wherein the method further comprises, prior to the generating of the numeric representation selecting a given one of the plurality of sets of ordered lists.

8. A system configured to execute a Machine Learning Algorithm (MLA), the system comprising a first server, a plurality of second servers, and a plurality of databases associated with the plurality of second servers, the MLA executable by the first server to predict a target value for an in-use object, the MLA comprising a set of models hosted by the plurality of second servers, each model of the set of models being based on an ensemble of decision trees, the decision trees being configured to process a categorical feature value by converting it into a numeric representation thereof, the categorical feature being associated with a training object used for training the MLA, the training object being processed in a node of a given level of a decision tree of the ensemble of decision trees, the decision tree having at least one prior level of the decision tree, the at least one prior level having at least one prior training object having at least one prior categorical feature value having been converted to a prior numeric representation thereof for the at least one prior level of the decision tree, the first server comprising:
  at least one non-transitory computer-readable medium comprising executable instructions;
  at least one processor coupled to the at least one non-transitory computer-readable medium, wherein the instructions, when executed by the at least one processor, cause the first server to:
    access, from a non-transitory computer-readable medium of the system, a set of training objects, wherein each training object of the set of training objects contains a document and an event indicator associated with the document, and wherein each document is associated with a categorical feature;
  organizing the set of training objects into an ordered list of training objects, wherein when the training objects are associated with an inherent temporal order, the ordered list of training objects are ordered in accordance with the temporal order and when the training objects do not have an inherent temporal order, generating the ordered list of training objects in a random order of the training objects to be used as the ordered list of training objects;
  and
  send, to the plurality of second servers, the set of training objects;
the plurality of second servers comprising:
at least one non-transitory computer-readable medium comprising executable instructions; and
at least one processor coupled to the at least one non-transitory computer-readable medium, wherein the instructions, when executed by the at least one processor of the plurality of second servers, cause the plurality of second servers to:
  store the set of training objects in the plurality of databases, wherein each database of the plurality of databases comprises a copy of the set of training objects, and wherein each second server of the plurality of second servers is associated with a respective database of the plurality of databases;
  generate, by operating in parallel, each second server accessing the set of training objects on its respective database of the plurality of databases, the set of models for the MLA, wherein generating each model of the set of models comprises generating the numeric representation of the categorical feature value by:
    retrieving the prior numeric representation of the at least one prior categorical feature value for a given object of the set of training objects at the at least one prior level of the decision tree; and
    generating, for each combination of the at least one prior categorical feature value at the at least one prior level of the decision tree and at least one of the categorical feature values of the set of training objects, a current numeric representation for the given level of the decision tree, wherein the current numeric representation is generated by:
      (i) counting a first number of training objects that precede the training object in the ordered list and have both the at least one of the categorical feature values and event indicators with positive outcomes,
      (ii) counting a second number of total training objects that precede the training object in the ordered list with the at least on of the categorical feature values, and
      (iii) dividing the first number by the second number;
  the generating the current numeric representation being done while generating the decision tree; and
  send, to the first server, the set of models.

9. The method of claim 1, wherein numeric representations are calculated only for combinations of categorical features that occur in the set of training objects.

* * * * *